United States Patent
Uenaka

(10) Patent No.: US 8,089,519 B2
(45) Date of Patent: Jan. 3, 2012

(54) PHOTOGRAPHIC APPARATUS

(75) Inventor: Yukio Uenaka, Tokyo (JP)

(73) Assignee: PENTAX Ricoh Imaging Company, Ltd., Tokyo (JP)

( * ) Notice: Subject to any disclaimer, the term of this patent is extended or adjusted under 35 U.S.C. 154(b) by 251 days.

(21) Appl. No.: 12/629,074

(22) Filed: Dec. 2, 2009

(65) Prior Publication Data

US 2010/0165124 A1 Jul. 1, 2010

(30) Foreign Application Priority Data

Dec. 25, 2008 (JP) ................................ 2008-330415

(51) Int. Cl.
*H04N 5/228* (2006.01)
*G03B 39/00* (2006.01)
*G03B 17/00* (2006.01)

(52) U.S. Cl. .............. 348/208.7; 348/208.99; 396/7; 396/13; 396/50; 396/55

(58) Field of Classification Search ............ 348/208.7; 396/7, 13, 50, 55
See application file for complete search history.

(56) References Cited

U.S. PATENT DOCUMENTS

| | | | | |
|---|---|---|---|---|
| 5,727,234 | A * | 3/1998 | Sakagami et al. | 396/52 |
| 6,057,889 | A * | 5/2000 | Reitmeier et al. | 348/555 |
| 6,505,221 | B1 | 1/2003 | Maschmann | 708/306 |
| 6,556,783 | B1 * | 4/2003 | Gelphman | 396/20 |
| 6,714,692 | B1 * | 3/2004 | Kim et al. | 382/299 |
| 7,480,416 | B2 * | 1/2009 | Liao et al. | 382/240 |
| 7,639,933 | B2 * | 12/2009 | Seo et al. | 396/55 |
| 2002/0181593 | A1 * | 12/2002 | Acharya et al. | 375/240.19 |
| 2005/0001906 | A1 * | 1/2005 | Sato et al. | 348/208.6 |
| 2005/0088546 | A1 * | 4/2005 | Wang | 348/239 |
| 2006/0284495 | A1 * | 12/2006 | Seo et al. | 310/12 |
| 2008/0145041 | A1 * | 6/2008 | Enomoto | 396/53 |
| 2009/0040329 | A1 | 2/2009 | Uehara | |
| 2009/0040347 | A1 | 2/2009 | Uehara | |
| 2009/0208196 | A1 * | 8/2009 | Ohno et al. | 396/55 |

(Continued)

FOREIGN PATENT DOCUMENTS

JP 2006-071743 3/2006

OTHER PUBLICATIONS

U.S. Appl. No. 12/630,095 to Uenaka, which was filed on Dec. 3, 2009.
U.S. Appl. No. 12/629,090 to Uenaka, which was filed on Dec. 2, 2009.

(Continued)

*Primary Examiner* — Lin Ye
*Assistant Examiner* — Chia-Wei A Chen
(74) *Attorney, Agent, or Firm* — Greenblum & Bernstein, P.L.C.

(57) ABSTRACT

A photographic apparatus comprises a movable platform and a controller.
The movable platform has an imager that captures an optical image through a taking lens, and is movable and rotatable on an xy plane.
The controller calculates an inclination angle of the photographic apparatus, which is formed by rotation of the photographic apparatus around the optical axis, and performs a controlled movement of the movable platform for an inclination correction by rotating the movable platform from an initial state on the xy plane in accordance to a rotation quantity of the movable platform.
The controller performs the controlled movement so as to compensate the rotation quantity under the condition in which the absolute value of the rotation quantity decreases in accordance to an increasing absolute value of the inclination angle, when the inclination angle is larger than a second angle but less than a third angle.

3 Claims, 22 Drawing Sheets

U.S. PATENT DOCUMENTS

| | | |
|---|---|---|
| 2009/0245768 A1 | 10/2009 | Uenaka |
| 2009/0245770 A1 | 10/2009 | Uenaka |
| 2009/0245771 A1 | 10/2009 | Uenaka |
| 2009/0245773 A1 | 10/2009 | Uenaka |
| 2009/0245774 A1 | 10/2009 | Uenaka |
| 2009/0251551 A1 | 10/2009 | Uenaka |
| 2010/0103275 A1* | 4/2010 | Molgaard ............ 348/208.4 |
| 2010/0245603 A1* | 9/2010 | Hashi et al. ......... 348/208.5 |
| 2010/0302385 A1* | 12/2010 | Kurihara ............. 348/208.4 |
| 2011/0205375 A1* | 8/2011 | Molgaard ............ 348/208.2 |
| 2011/0211081 A1* | 9/2011 | Tsubaki et al. ...... 348/208.1 |

OTHER PUBLICATIONS

U.S. Appl. No. 12/629,076 to Uenaka, which was filed on Dec. 2, 2009.

U.S. Appl. No. 12/629,080 to Uenaka, which was filed on Dec. 2, 2009.

U.S. Appl. No. 12/629,082 to Uenaka, which was filed on Dec. 2, 2009.

U.S. Appl. No. 12/629,085 to Uenaka, which was filed on Dec. 2, 2009.

* cited by examiner

Fig. 3
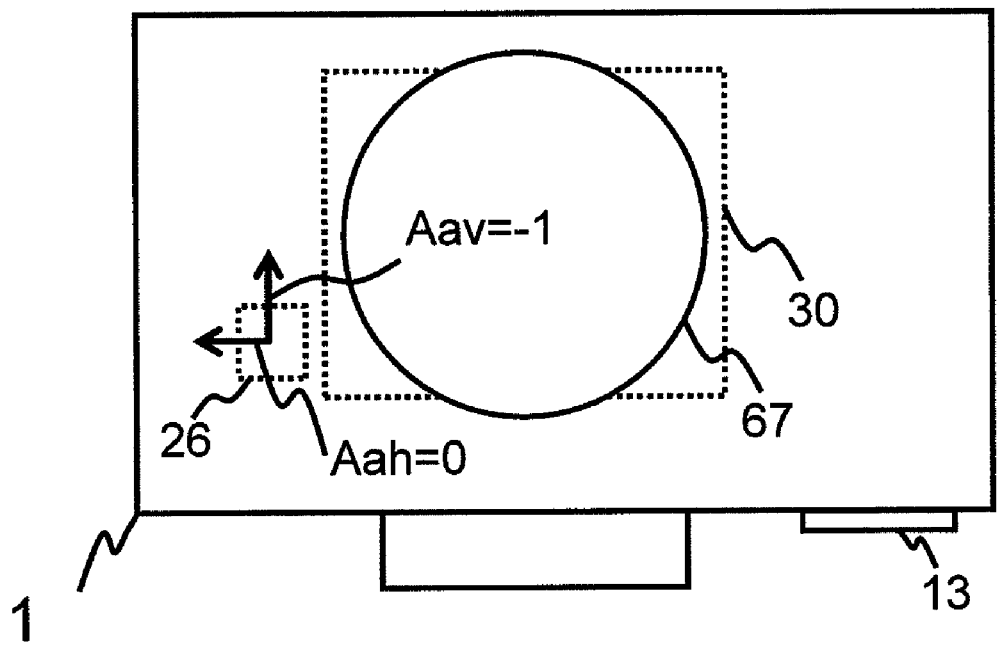
Direction of gravitational force

Fig. 12
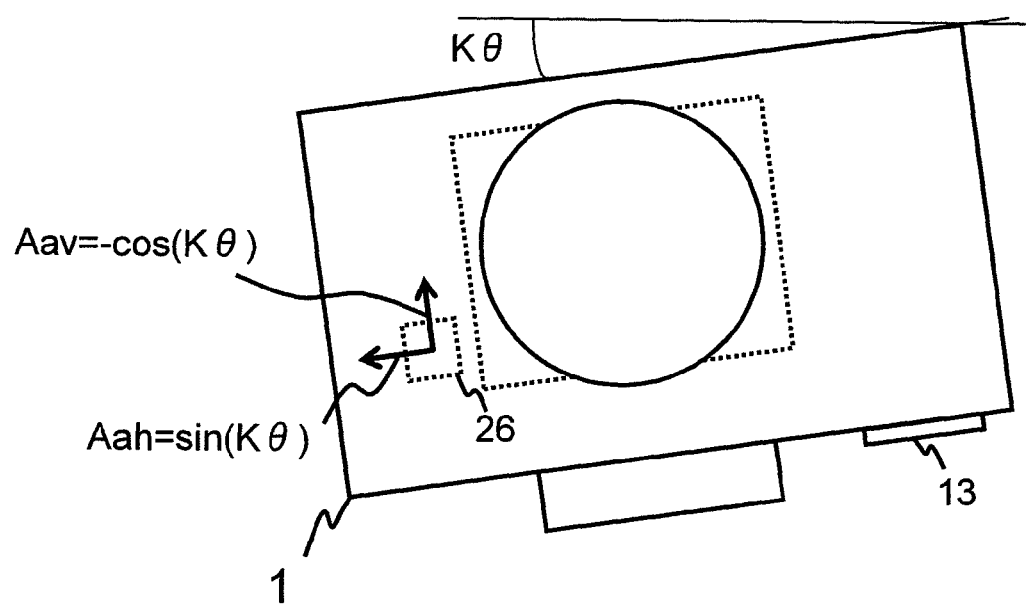
Direction of gravitational force

US 8,089,519 B2

PHOTOGRAPHIC APPARATUS

BACKGROUND OF THE INVENTION

1. Field of the Invention

The present invention relates to a photographic apparatus, and in particular, to a photographic apparatus that performs an inclination correction.

2. Description of the Related Art

There is known a type of image stabilization (also known as anti-shake, but hereinafter, simply "stabilization") apparatus for a photographic apparatus. The image stabilization apparatus corrects for the effects of hand shake either by moving a movable platform including an image stabilization lens or by moving an imager (an imaging sensor) on an xy plane perpendicular to an optical axis of a taking lens of the photographic apparatus.

Japanese unexamined patent publication (KOKAI) No. 2006-71743 discloses an image stabilization apparatus that calculates hand-shake quantity on the basis of the yaw, pitch, and roll components of hand shake, and then performs a stabilization operation on the basis of the hand-shake quantity.

In this stabilization operation, the following stabilization functions are performed: a first stabilization that corrects the yaw component of hand shake, a second stabilization that corrects the pitch component of hand shake, and a third stabilization that corrects the roll component of hand shake.

In the third stabilization, the rotation angle of the photographic apparatus is calculated from the point when the third stabilization commences. However, the inclination angle of the photographic apparatus, which is formed by rotation of the photographic apparatus around its optical axis, as measured with respect to a level plane, is not considered. The inclination angle changes according to the orientation of the photographic apparatus.

If the photographic apparatus is inclined when the stabilization commences, the third stabilization is performed so as to maintain this inclined state. Therefore, the inclination correction in order to level is not performed and none of the four sides of the rectangle composing the outline of the imaging surface of the imager are parallel to either the x direction or the y direction, in other words, the image is captured with the imager being inclined.

SUMMARY OF THE INVENTION

Therefore, an object of the present invention is to provide a photographic apparatus that performs the inclination correction.

According to the present invention, a photographic apparatus comprises a movable platform and a controller.

The movable platform has an imager that captures an optical image through a taking lens, and is movable and rotatable on an xy plane perpendicular to an optical axis of the taking lens.

The controller calculates an inclination angle of the photographic apparatus, which is formed by rotation of the photographic apparatus around the optical axis, as measured with respect to a level plane perpendicular to the direction of gravitational force, and performs a controlled movement of the movable platform for an inclination correction by rotating the movable platform from an initial state on the xy plane in accordance to a rotation quantity of the movable platform. The initial state is a position of the movable platform before rotating for the inclination correction. The rotation quantity is set on the basis of the inclination angle.

The controller performs the controlled movement so as to offset the inclination angle by the rotation quantity, when the photographic apparatus is in a first inclination state where the absolute value of the inclination angle is less than or equal to a first angle. The first angle is the maximum rotation angle at which the movable platform can be rotated within its movement range in the initial state.

The controller performs the controlled movement so as to maintain an inclined state where the movable platform is rotated from the initial state in accordance to either the first angle or the negative (same magnitude but opposite direction) of the first angle, when the photographic apparatus is in a second inclination state where the inclination angle is larger than the first angle but less than or equal to a second angle that is larger than the first angle.

The controller performs the controlled movement so as to compensate the rotation quantity under the condition in which the absolute value of the rotation quantity decreases in accordance to an increasing absolute value of the inclination angle, when the photographic apparatus is in a third inclination state where the inclination angle is larger than the second angle but less than or equal to a third angle that is larger than the second angle.

The controller performs the controlled movement so as to maintain the initial state, when the photographic apparatus is in a fourth inclination state where the inclination angle is larger than the third angle.

BRIEF DESCRIPTION OF THE DRAWINGS

The objects and advantages of the present invention will be better understood from the following description, with reference to the accompanying drawings in which:

FIG. 3 is a front view of the photographic apparatus, when the photographic apparatus is held in the second horizontal orientation;

FIG. 12 is a front view of the photographic apparatus, and Kθ is the angle formed when the photographic apparatus is rotated (inclined) in a counter-clockwise direction as viewed from the front, away from the second horizontal orientation;

DESCRIPTION OF THE PREFERRED EMBODIMENTS

Figure 1:
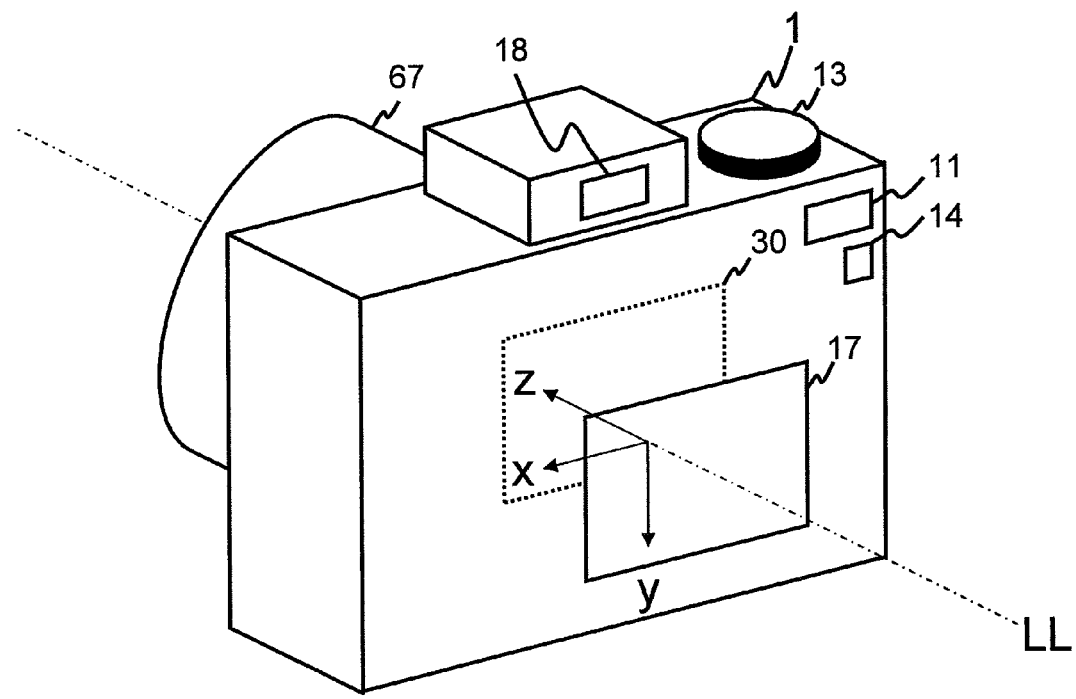
FIG. 1 is a perspective view of the embodiment of the photographic apparatus as viewed from the rear.

The present invention is described below with reference to the embodiment shown in the drawings. In the embodiment, the photographic apparatus 1 is a digital camera. A camera lens (i.e. taking lens) 67 of the photographic apparatus 1 has the optical axis LL.

By way of orientation in the embodiment, the x direction, the y direction, and the z direction are defined (see FIG. 1). The x direction is the direction perpendicular to the optical axis LL. The y direction is the direction perpendicular to both the optical axis LL and the x direction. The z direction is the direction parallel to the optical axis LL and perpendicular to both the x direction and the y direction.

The relationships between the direction of gravitational force and the x direction, the y direction, and the z direction, change according to the orientation of the photographic apparatus 1.

For example, when the photographic apparatus 1 is held in the first horizontal orientation, in other words, when the photographic apparatus 1 is held horizontally and the upper surface of the photographic apparatus 1 faces upward (see FIG. 2), the x direction and the z direction are perpendicular to the direction of gravitational force and the y direction is parallel to the direction of gravitational force.

When the photographic apparatus 1 is held in the second horizontal orientation, in other words, when the photographic apparatus 1 is held horizontally and the lower surface of the photographic apparatus 1 faces upward (see FIG. 3), the x direction and the z direction are perpendicular to the direction of gravitational force and the y direction is parallel to the direction of gravitational force.

Figure 4:
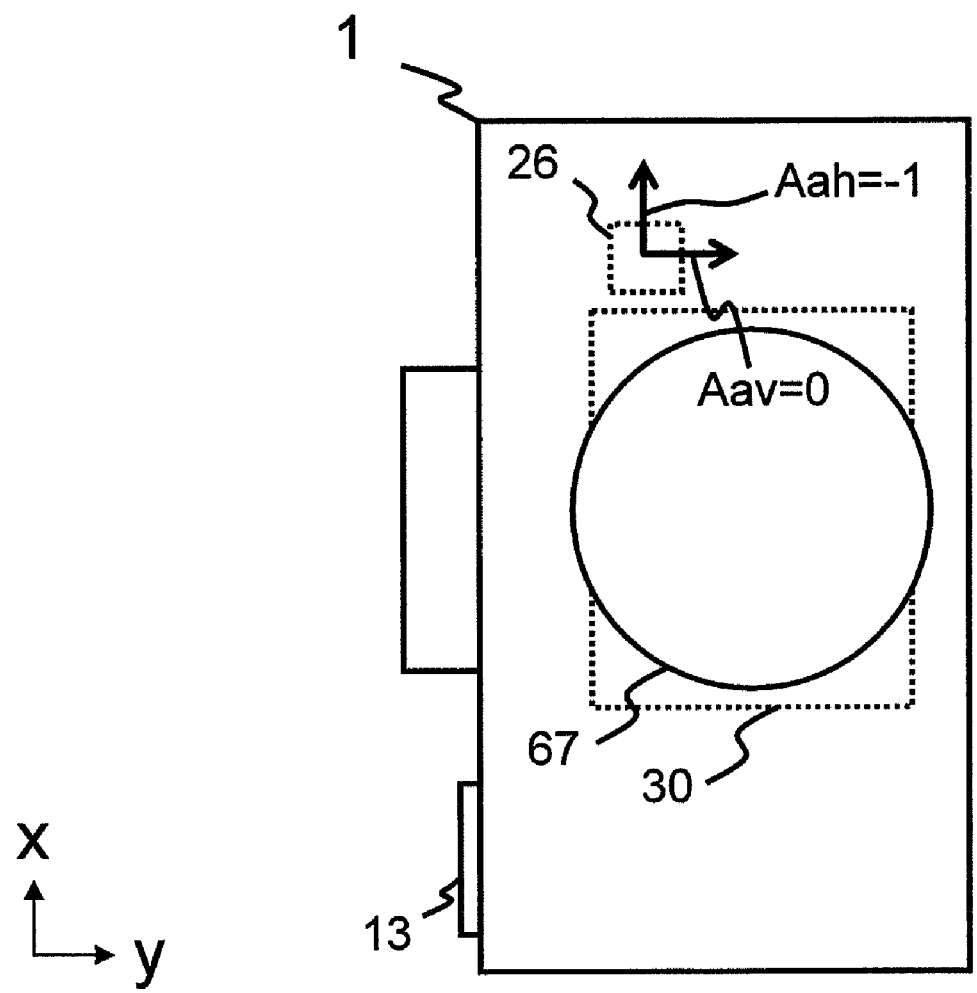
FIG. 4 is a front view of the photographic apparatus, when the photographic apparatus is held in the first vertical orientation.

When the photographic apparatus 1 is held in the first vertical orientation, in other words, when the photographic apparatus 1 is held vertically and one of the side surfaces of the photographic apparatus 1 faces upward (see FIG. 4), the x direction is parallel to the direction of gravitational force and the y direction and the z direction are perpendicular to the direction of gravitational force.

Figure 5:
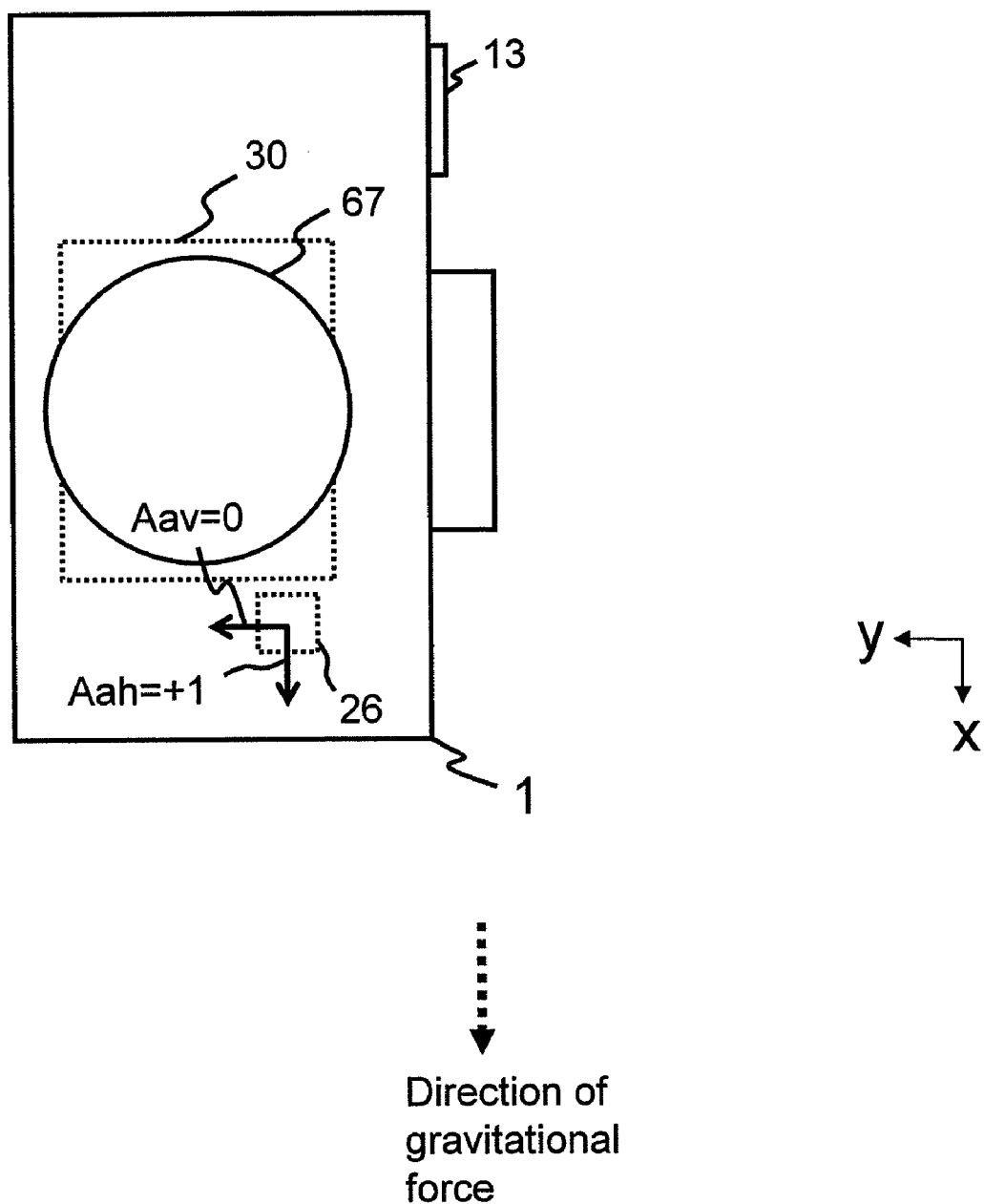
FIG. 5 is a front view of the photographic apparatus, when the photographic apparatus is held in the second vertical orientation.

When the photographic apparatus 1 is held in the second vertical orientation, in other words, when the photographic apparatus 1 is held vertically and the other side surface of the photographic apparatus 1 faces upward (see FIG. 5), the x direction is parallel to the direction of gravitational force and the y direction and the z direction are perpendicular to the direction of gravitational force.

When the front surface of the photographic apparatus 1 faces in the direction of gravitational force, the x direction and the y direction are perpendicular to the direction of gravitational force and the z direction is parallel to the direction of gravitational force. The front surface of the photographic apparatus 1 is the side on which the camera lens 67 is attached.

Figure 2:
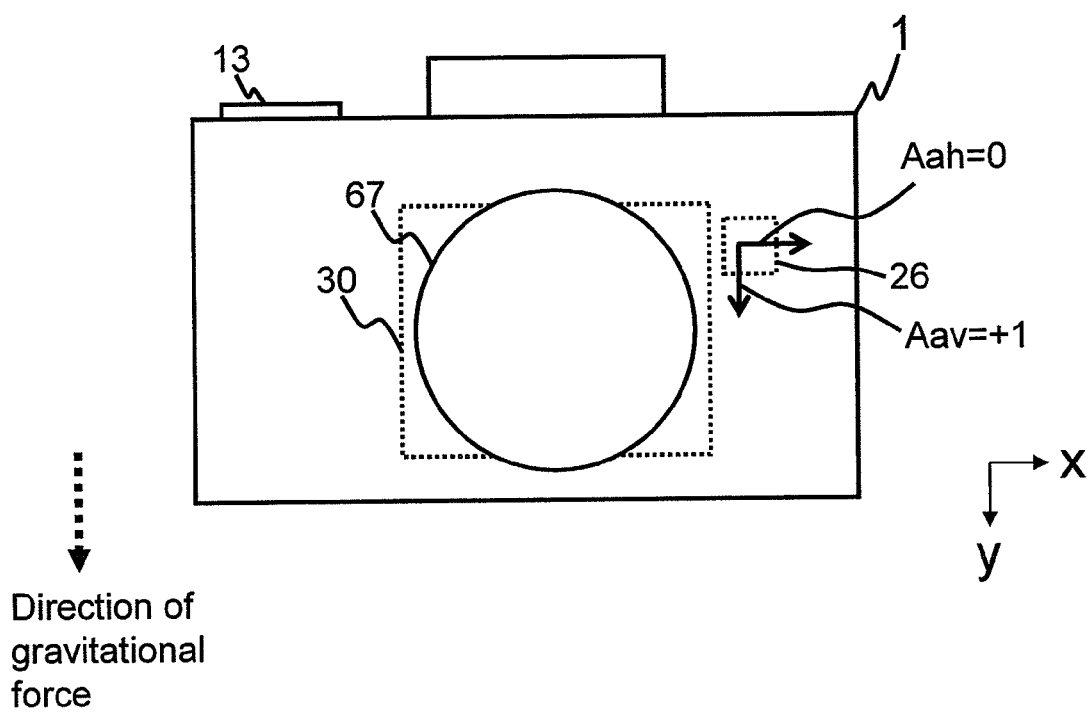
FIG. 2 is a front view of the photographic apparatus, when the photographic apparatus is held in the first horizontal orientation.
Figure 6:
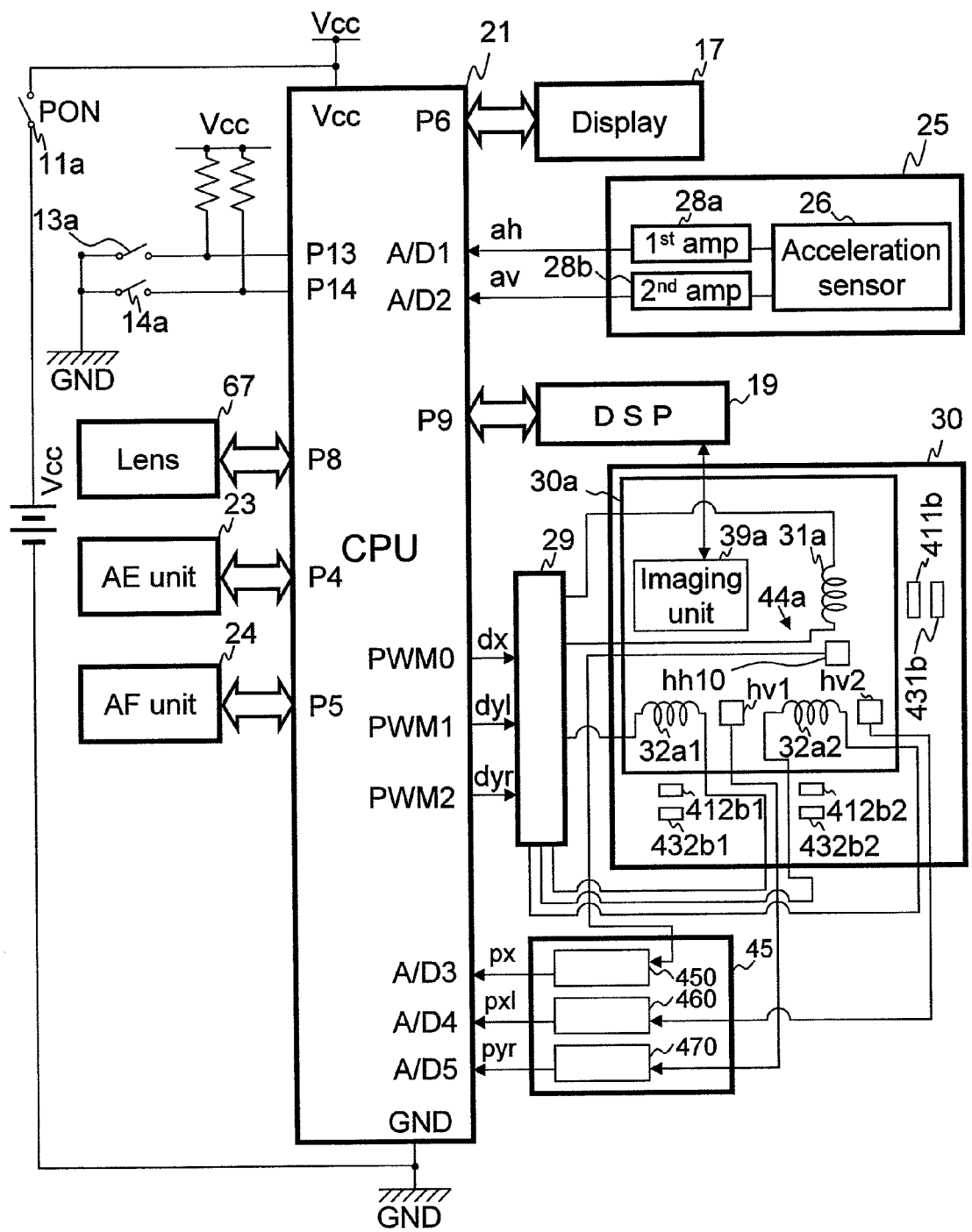
FIG. 6 is a circuit construction diagram of the photographic apparatus.

The imaging part of the photographic apparatus 1 comprises a PON button 11, a PON switch 11a, a shutter release button 13, a shutter release switch 13a for an exposure operation, an inclination-correction ON/OFF button 14, an inclination-correction ON/OFF switch 14a, a display 17 such as an LCD monitor or the like, an optical finder 18, a DSP 19, a CPU 21, an AE (automatic exposure) unit 23, an AF (automatic focus) unit 24, an imaging unit 39a in the inclination correction unit 30, and the camera lens 67 (see FIGS. 1, 2, and 6).

Whether the PON switch 11a is in the ON state or OFF state is determined by the state of the PON button 11. The ON/OFF states of the photographic apparatus 1 correspond to the ON/OFF states of the PON switch 11a.

The subject image is captured as an optical image through the camera lens 67 by the imaging unit 39a, and the captured image is displayed on the display 17 (the through image indication). The subject image can be optically observed through the optical finder 18.

When the shutter release button 13 is fully depressed by the operator, the shutter release switch 13a changes to the ON state so that the imaging operation is performed by the imaging unit 39a (the imaging apparatus), and the captured image is stored.

The information indicating whether the shutter release switch 13a is in the ON or OFF state is input to port P13 of the CPU 21 as a 1-bit digital signal.

The display 17 is connected to port P6 of the CPU 21 for inputting and outputting signals, and displays the through image or the still image captured by the imaging operation.

Figure 7:
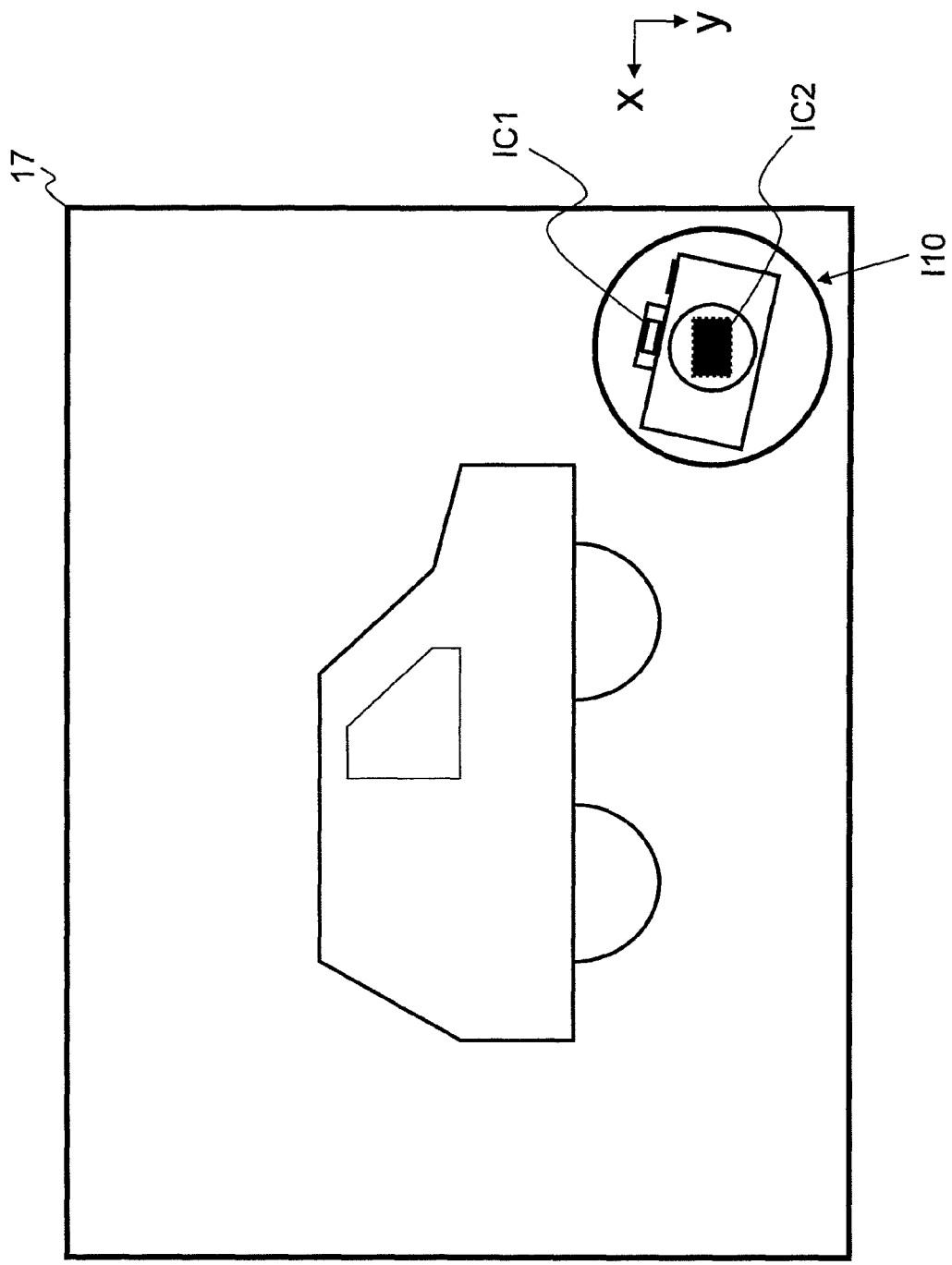
FIG. 7 shows a through image including inclination information in the first inclination state.
Figure 8:
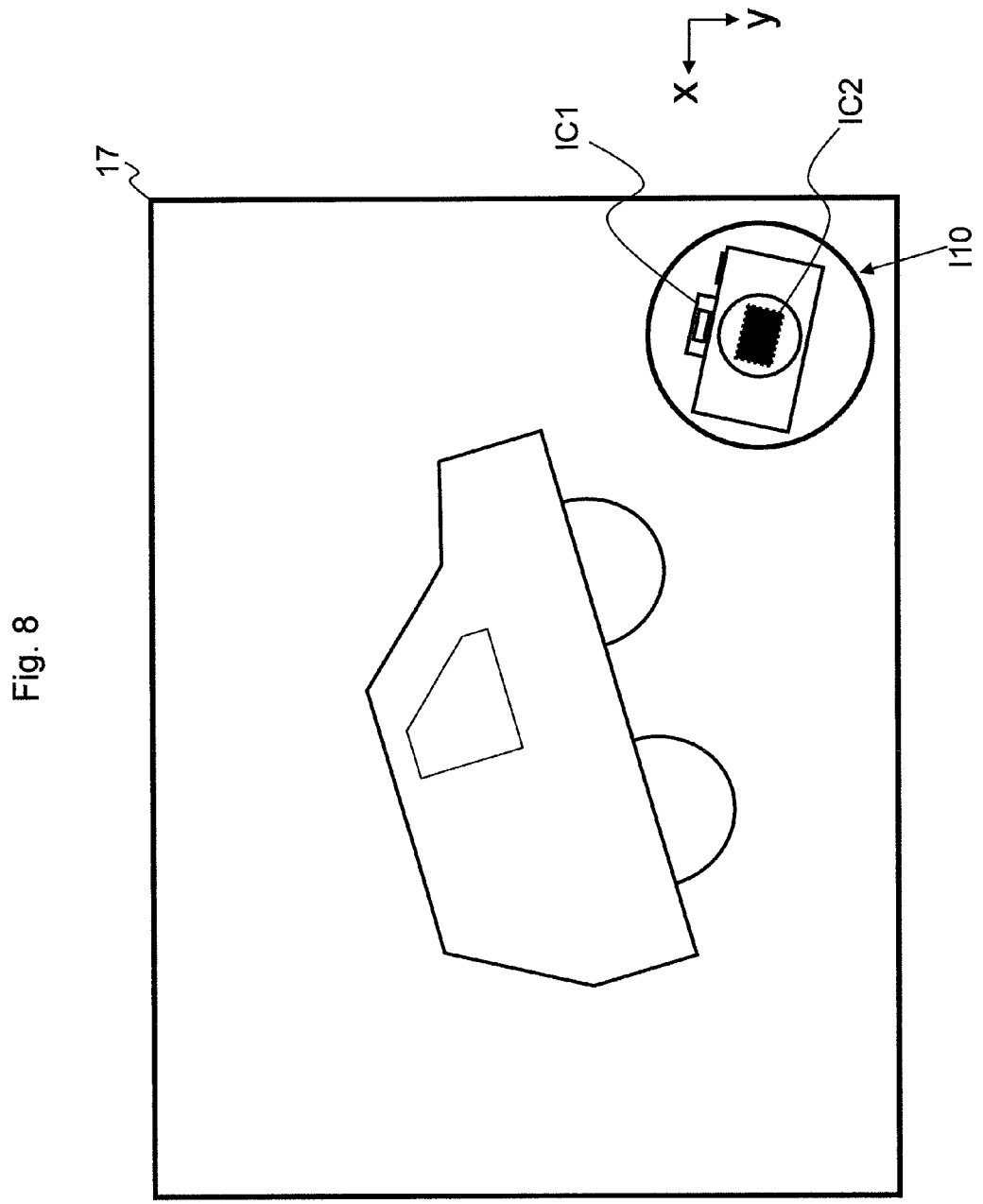
FIG. 8 shows a through image including inclination information in the fourth inclination state.

Furthermore, the display 17 indicates inclination information I10 showing an inclination state of the photographic apparatus 1 (a first inclination state ST1, a second inclination state ST2, a third inclination state ST3, or a fourth inclination state ST4) (see FIGS. 7 and 8). The inclination information I10 is determined on the basis of the camera inclination angle Kθ (=−α).

The camera lens 67 is an interchangeable lens of the photographic apparatus 1 and is connected to port P8 of the CPU 21. The camera lens 67 outputs the lens information stored in a built-in ROM in the camera lens 67, to the CPU 21, when the photographic apparatus 1 is set to the ON state etc.

The DSP 19 is connected to port P9 of the CPU 21 and to the imaging unit 39a. Based on a command from the CPU 21, the DSP 19 performs the calculation operations, such as the image-processing operation, etc., on the image signal obtained by the imaging operation of the imaging unit 39a.

The CPU 21 is a control apparatus that controls each part of the photographic apparatus 1 in its imaging operation, and controls the movement of the movable platform 30a when the inclination correction is performed.

The inclination correction includes both the controlled movement of the movable platform 30a and position-detection efforts.

The AE unit (exposure-calculating unit) 23 performs the photometric operation and calculates photometric values based on the subject being photographed. The AE unit 23 also calculates the aperture value and the duration of the exposure operation, with respect to the photometric values, both of which are needed for the imaging operation. The AF unit 24 performs the AF sensing operation and the corresponding focusing operation, both of which are needed for the imaging operation. In the focusing operation, the camera lens 67 is re-positioned along the optical axis LL.

The AE unit 23 is connected to port P4 of the CPU 21 for inputting and outputting signals. The AF unit 24 is connected to port P5 of the CPU 21 for inputting and outputting signals.

The inclination-correction part (the inclination-correction apparatus) of the photographic apparatus 1 comprises an inclination-correction ON/OFF button 14, an inclination-correction ON/OFF switch 14a, a display 17, a CPU 21, an inclination detection unit 25, a driver circuit 29, an inclination correction unit 30, and a hall sensor signal-processing unit (a signal processing circuit of the magnetic-field change-detecting element) 45.

The ON/OFF states of the inclination-correction ON/OFF switch 14a change according to the operation state of the inclination-correction ON/OFF button 14.

Specifically, when the inclination-correction ON/OFF button 14 is depressed by the operator, the inclination-correction ON/OFF switch 14a is changed to the ON state so that the inclination correction, in which the inclination detection unit 25 and the inclination correction unit 30 are driven independently of the other operations that include the photometric operation etc., is carried out in the predetermined time interval. When the inclination-correction ON/OFF switch 14a is in the ON state, (in other words in the inclination-correction mode), the inclination-correction parameter CP is set to 1 (CP=1). When the inclination-correction ON/OFF switch 14a is not in the ON state, (in other words in the non-inclination correction mode), the inclination-correction parameter CP is set to 0 (CP=0). In the embodiment, the value of the predetermined time interval is set to 1 ms.

The information indicating whether the inclination-correction ON/OFF switch 14a is in the ON or OFF state is input to port P14 of the CPU 21 as a 1-bit digital signal.

Next, the details of the input and output relationships between the CPU 21 and the inclination detection unit 25, the driver circuit 29, the inclination correction unit 30, and the hall sensor signal-processing unit 45 are explained.

The inclination detection unit 25 has an acceleration sensor 26, a first amplifier 28a, and a second amplifier 28b.

The acceleration sensor 26 detects a first gravitational component and a second gravitational component. The first gravitational component is the horizontal component of gravitational acceleration in the x direction. The second gravitational component is the vertical component of gravitational acceleration in the y direction.

The first amplifier 28a amplifies the signal representing the first gravitational component output from the acceleration sensor 26, and outputs the analog signal to the A/D converter A/D 1 of the CPU 21 as a first acceleration ah.

The second amplifier 28b amplifies the signal representing the second gravitational component output from the acceleration sensor 26, and outputs the analog signal to the A/D converter A/D 2 of the CPU 21 as a second acceleration av.

When the inclination correction is performed (CP=1), the inclination correction unit 30 rotates the movable platform 30a including the imaging unit 39a around an axis parallel to the optical axis LL in order to correct (reduce) the inclination of the photographic apparatus 1 caused by its undesired rotation about the optical axis LL, as measured with respect to a level plane perpendicular to the direction of gravitational force.

In other words, in the inclination correction, the controlled movement repositions the movable platform 30a so that the upper and lower sides of the rectangle composing the outline of the imaging surface of the imager 39a1 are perpendicular to the direction of gravitational force and the left and right sides are parallel to the direction of gravitational force.

Therefore, the imager 39a1 can be automatically leveled without using a level vial. When the photographic apparatus 1 images a subject including the horizon, the imaging operation can be performed with the upper and lower sides of the rectangle composing the outline of the imaging surface of the imager 39a1 parallel to the horizon.

Specifically, the inclination correction unit 30 is an apparatus that performs the inclination correction by moving the imaging unit 39a to the position S where the imaging unit 39a (the movable platform 30a) should be moved, as calculated by the CPU 21 based on the information from the inclination detection unit 25.

The inclination correction unit 30 has a fixed unit 30b and a movable platform 30a that includes the imaging unit 39a and can be displaced and rotated on the xy plane.

The supply of electric power to the CPU 21 and each part of the inclination detection unit 25 begins after the PON switch 11a is set to the ON state (i.e. when the main power supply is set to the ON state). Inclination detection efforts by the inclination detection unit 25 for calculating the inclination angle (the camera inclination angle Kθ) begin after the PON switch 11a is set to the ON state.

The CPU 21 converts the first acceleration ah, which is input to the A/D converter A/D 1, to a first digital acceleration signal Dah (A/D conversion operation). It also calculates a first digital acceleration Aah by reducing the high-frequency component of the first digital acceleration signal Dah (the digital low-pass filtering) in order to reduce the noise component in the first digital acceleration signal Dah.

Similarly, the CPU 21 converts the second acceleration av, which is input to the A/D converter A/D 2, to a second digital acceleration signal Dav (A/D conversion operation). It also calculates a second digital acceleration Aav by reducing the high-frequency component of the second digital acceleration signal Dav (the digital low-pass filtering) in order to reduce the noise component in the second digital acceleration signal Dav.

Figure 9:
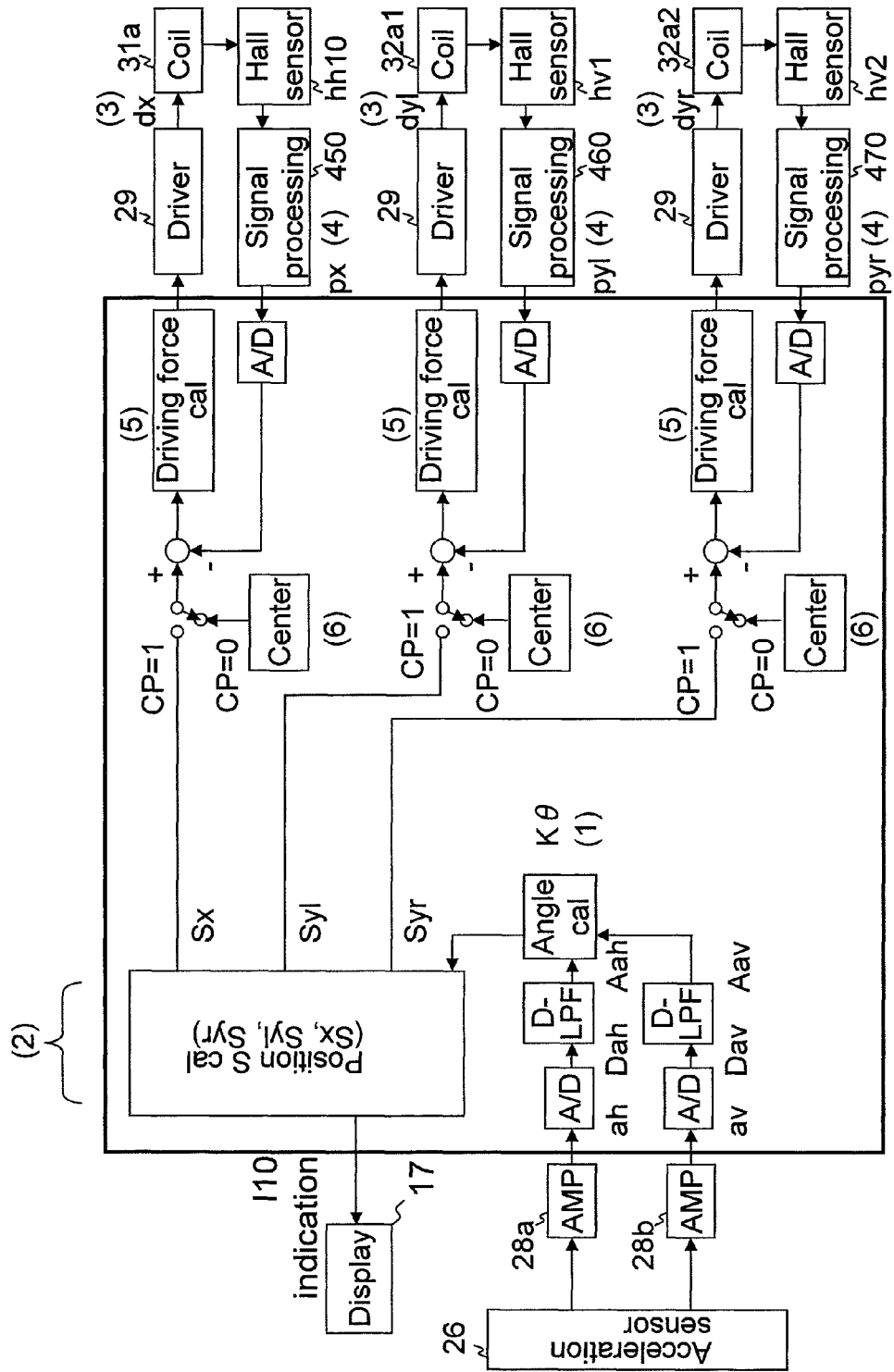
FIG. 9 illustrates the calculations involved in the inclination correction.

The CPU 21 also calculates the camera inclination angle Kθ of the photographic apparatus 1, which is formed by the rotation of the photographic apparatus 1 around its optical axis LL, and is measured with respect to the level plane perpendicular to the direction of gravitational force, on the basis of the magnitude of the difference between the absolute value of the first digital acceleration Aah and the absolute value of the second digital acceleration Aav (see (1) in FIG. 9).

The camera inclination angle Kθ of the photographic apparatus 1 changes according to the orientation of the photographic apparatus 1, and is measured with respect to one of either the first horizontal orientation, the second horizontal orientation, the first vertical orientation, or the second vertical orientation. Therefore, the camera inclination angle Kθ of the photographic apparatus 1 is represented by the angle at which the x direction or the y direction intersects the level plane.

When one of either the x direction or y direction lies on the level plane, and when the other of the x direction or y direction intersects the level plane at an angle of 90 degrees, the photographic apparatus 1 is in a non-inclined state.

Thus, the CPU 21 and the inclination detection unit 25 have a function for calculating the inclination angle of the photographic apparatus 1.

The first digital acceleration Aah (the first gravitational component) and the second digital acceleration Aav (the second gravitational component) change according to the orientation of the photographic apparatus 1, and take values from −1 to +1.

For example, when the photographic apparatus 1 is held in the first horizontal orientation, in other words, when the photographic apparatus 1 is held horizontally and the upper surface of the photographic apparatus 1 faces upward (see FIG. 2), the first digital acceleration Aah is 0 and the second digital acceleration Aav is +1.

When the photographic apparatus 1 is held in the second horizontal orientation, in other words, when the photographic apparatus 1 is held horizontally and the lower surface of the photographic apparatus 1 faces upward (see FIG. 3), the first digital acceleration Aah is 0 and the second digital acceleration Aav is −1.

When the photographic apparatus 1 is held in the first vertical orientation, in other words, when the photographic apparatus 1 is held vertically and one of the side surfaces of the photographic apparatus 1 faces upward (see FIG. 4), the first digital acceleration Aah is −1 and the second digital acceleration Aav is 0.

When the photographic apparatus 1 is held in the second vertical orientation, in other words, when the photographic apparatus 1 is held vertically and the other side surface of the photographic apparatus 1 faces upward (see FIG. 5), the first digital acceleration Aah is +1 and the second digital acceleration Aav is 0.

When the front surface of the photographic apparatus 1 faces the direction of gravitational force or the opposite direction, in other words, when the front surface of the photographic apparatus 1 faces upward or downward, the first digital acceleration Aah and the second digital acceleration Aav are 0.

Figure 10:
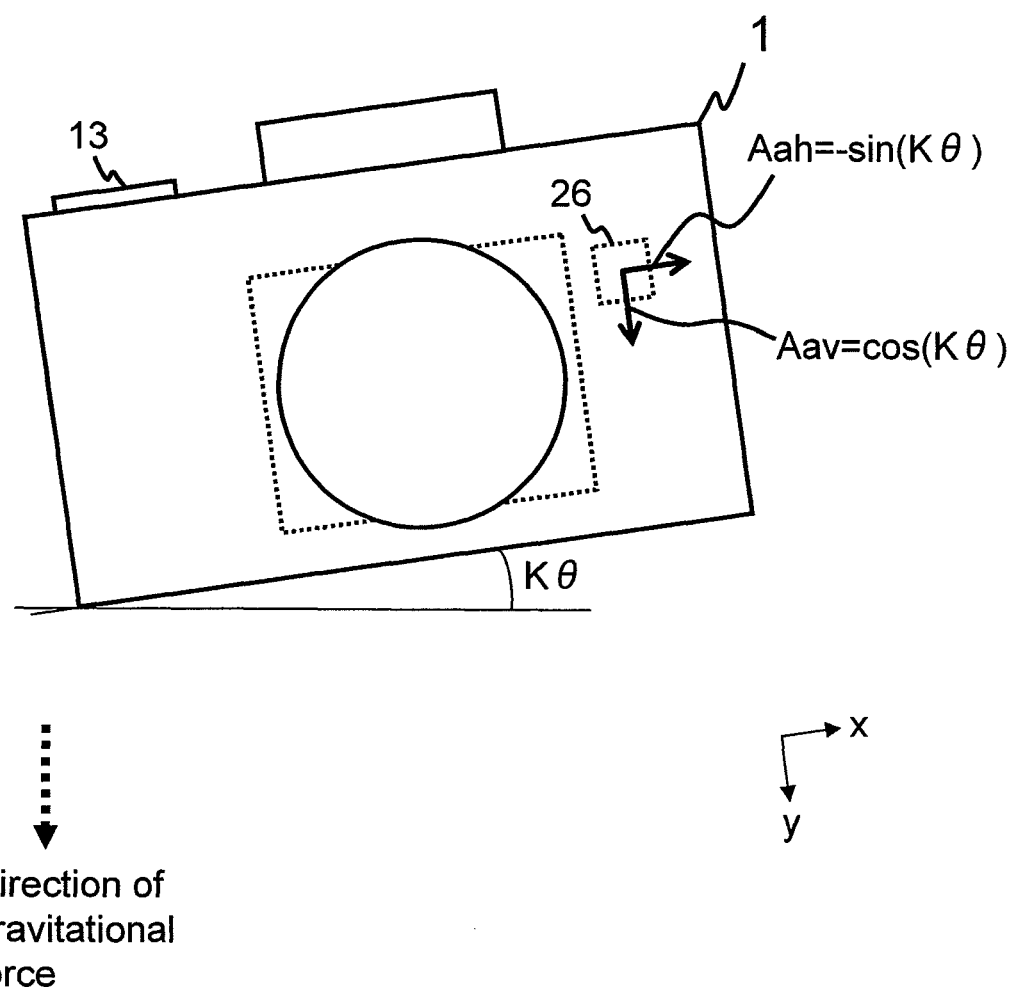
FIG. 10 is a front view of the photographic apparatus, and Kθ is the angle formed when the photographic apparatus is rotated (inclined) in a counter-clockwise direction as viewed from the front, away from the first horizontal orientation.

When the photographic apparatus 1 is rotated (inclined) at an angle Kθ in a counter-clockwise direction, as viewed from the front, from the first horizontal orientation (see FIG. 10), the first digital acceleration Aah is −sin(Kθ) and the second digital acceleration Aav is +cos(Kθ).

Therefore, the inclination angle (the camera inclination angle Kθ) can be calculated by performing an arcsine transformation on the first digital acceleration Aah and taking the negative or by performing an arccosine transformation on the second digital acceleration Aav.

Figure 20:
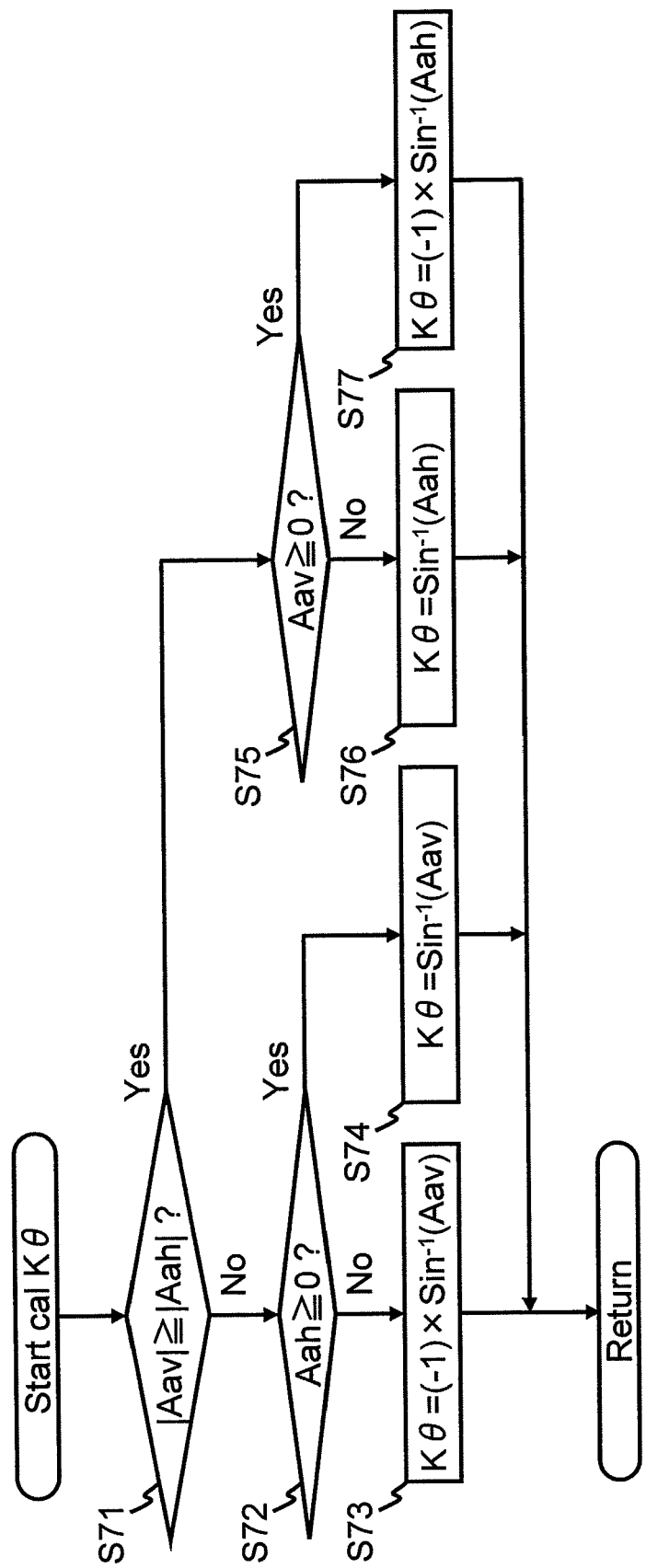
FIG. 20 is a flowchart that shows the details of the calculation of the camera inclination angle.

However, while the absolute value of the inclination angle Kθ is very small, in other words, nearly 0, the variation of the sine function is larger than that of the cosine function so that the inclination angle is best calculated by using the arcsine transformation rather than the arccosine transformation ($K\theta = -\sin^{-1}$ (Aah), see step S77 in FIG. 20).

Figure 11:
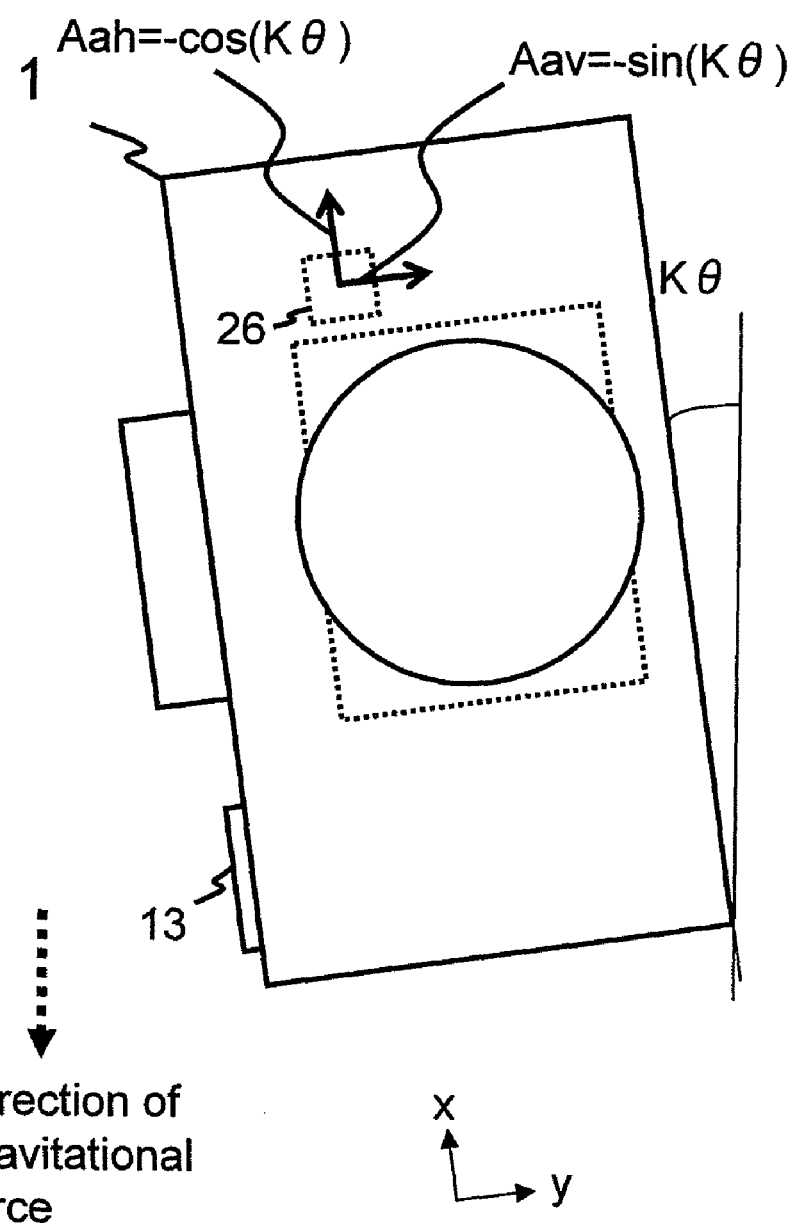
FIG. 11 is a front view of the photographic apparatus, and Kθ is the angle formed when the photographic apparatus is rotated (inclined) in a counter-clockwise direction as viewed from the front, away from the first vertical orientation.

When the photographic apparatus 1 is rotated (inclined) at an angle Kθ in a counter-clockwise direction, as viewed from the front, from the first vertical orientation (see FIG. 11), the first digital acceleration Aah is −cos(Kθ) and the second digital acceleration Aav is −sin(Kθ).

Therefore, the inclination angle (the camera inclination angle Kθ) can be calculated by performing an arccosine transformation on the first digital acceleration Aah and taking the negative or by performing an arcsine transformation on the second digital acceleration Aav and taking the negative.

However, while the absolute value of the inclination angle Kθ is very small, in other words, nearly 0, the variation of the sine function is larger than that of the cosine function so that the inclination angle is best calculated by using the arcsine transformation rather than the arccosine transformation ($K\theta = -\sin^{-1}$ (Aav), see step S73 in FIG. 20).

When the photographic apparatus 1 is rotated (inclined) at an angle Kθ in a counter-clockwise direction, as viewed from the front, from the second horizontal orientation (see FIG. 12), the first digital acceleration Aah is +sin(Kθ) and the second digital acceleration Aav is −cos(Kθ).

Therefore, the inclination angle (the camera inclination angle Kθ) can be calculated by performing an arcsine transformation on the first digital acceleration Aah or by performing an arccosine transformation on the second digital acceleration Aav and taking the negative.

However, while the absolute value of the inclination angle Kθ is very small, in other words, nearly 0, the variation of the sine function is larger than that of the cosine function so that the inclination angle is best calculated by using the arcsine transformation rather than the arccosine transformation ($K\theta = +\sin^{-1}$ (Aah), see step S76 in FIG. 20).

Figure 13:
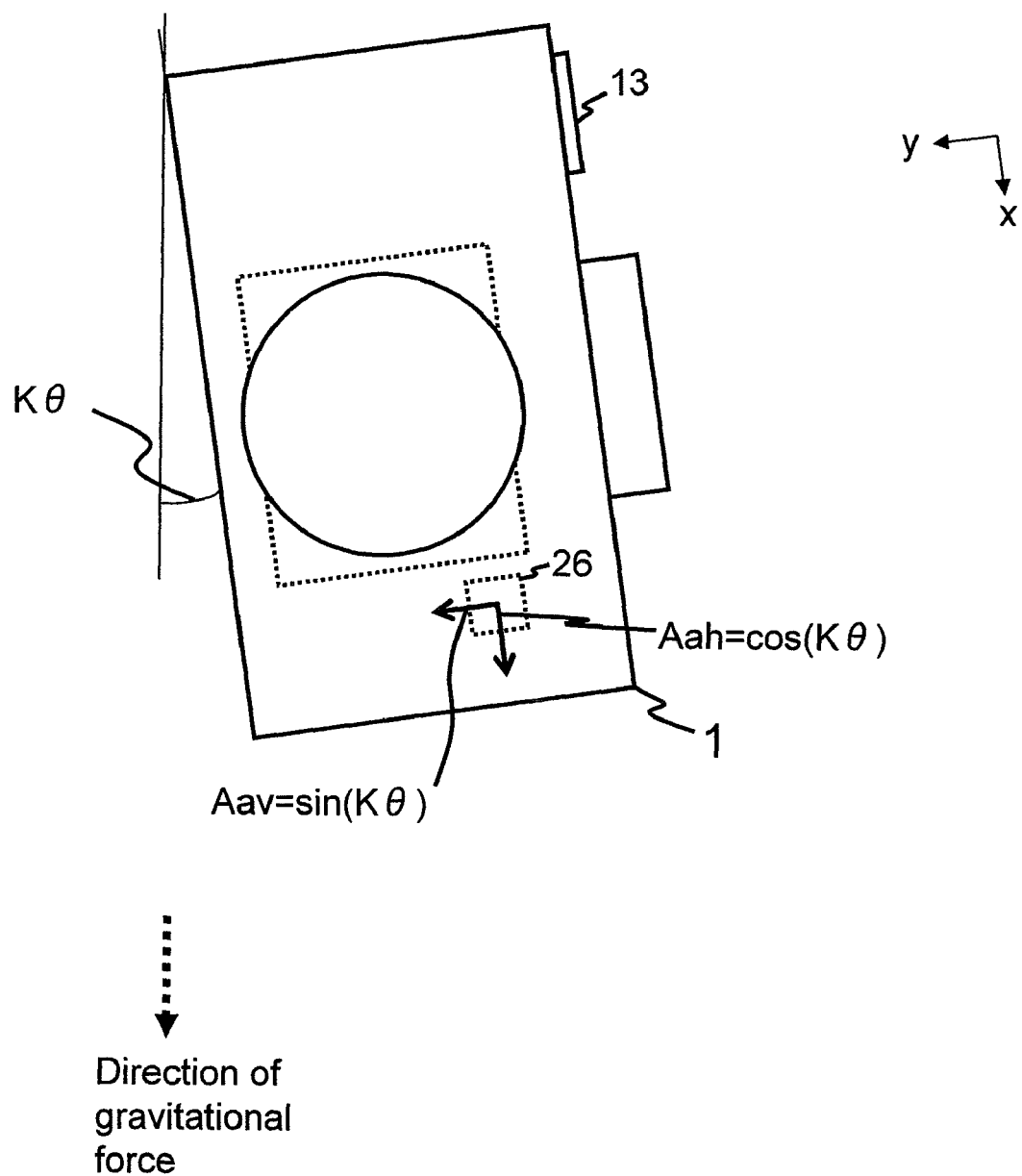
FIG. 13 is a front view of the photographic apparatus, and Kθ is the angle formed when the photographic apparatus is rotated (inclined) in a counter-clockwise direction as viewed from the front, away from the second vertical orientation.

When the photographic apparatus 1 is rotated (inclined) at an angle Kθ in a counter-clockwise direction, as viewed from the front, from the second vertical orientation (see FIG. 13), the first digital acceleration Aah is +cos(Kθ) and the second digital acceleration Aav is +sin(Kθ).

Therefore, the inclination angle (the camera inclination angle Kθ) can be calculated by performing an arccosine transformation on the first digital acceleration Aah or by performing an arcsine transformation on the second digital acceleration Aav.

However, while the absolute value of the inclination angle Kθ is very small, in other words, is nearly 0, the variation of the sine function is larger than that of the cosine function so that the inclination angle is best calculated by using the arcsine transformation rather than the arccosine transformation ($K\theta = +\sin^{-1}$ (Aav), see step S74 in FIG. 20).

The inclination angle, in other words, the camera inclination angle Kθ is calculated by performing the arcsine transformation on the smaller of the absolute value of the first digital acceleration Aah and the absolute value of the second digital acceleration Aav and by adding a positive or negative sign ($K\theta = +\sin^{-1}$ (Aah), $-\sin^{-1}$ (Aah), $+\sin^{-1}$ (Aav), or $-\sin^{-1}$ (Aav)).

Whether the positive or negative sign is added is determined on the basis of the larger of the absolute value of the first digital acceleration Aah and the absolute value of the second digital acceleration Aav, and the sign of that larger value without applying the absolute value (see steps S72 and S75 in FIG. 20). The details of this decision are explained by using the flowchart in FIG. 20.

In the embodiment, the acceleration detection operation that occurs during the interrupt process includes a process in the inclination detection unit 25 and the input of the first acceleration ah and the second acceleration av from the inclination detection unit 25 to the CPU 21.

The camera inclination angle Kθ determines the magnitude of the rotation quantity α of the movable platform 30a in the inclination correction (α=−Kθ).

Note, that the rotation quantity α is compensated under given conditions.

Specifically, when the absolute value of the rotation quantity α is less than or equal to a first angle θ1, in other words, the photographic apparatus 1 is in the first inclination state ST1, the compensation of the rotation quantity α is not performed.

When the absolute value of the rotation quantity α is larger than the first angle θ1 but is less than or equal to a second angle θ2 (>θ1), in other words, the photographic apparatus 1 is in the second inclination state ST2, the rotation quantity α is compensated to either θ1 or −θ1.

When the absolute value of the rotation quantity α is larger than the second angle θ2 but is less than or equal to a third angle θ3 (>θ2), in other words, the photographic apparatus 1 is in the third inclination state ST3, the rotation quantity is compensated to either +(θ3−α) or −(θ3+α).

Figure 14:
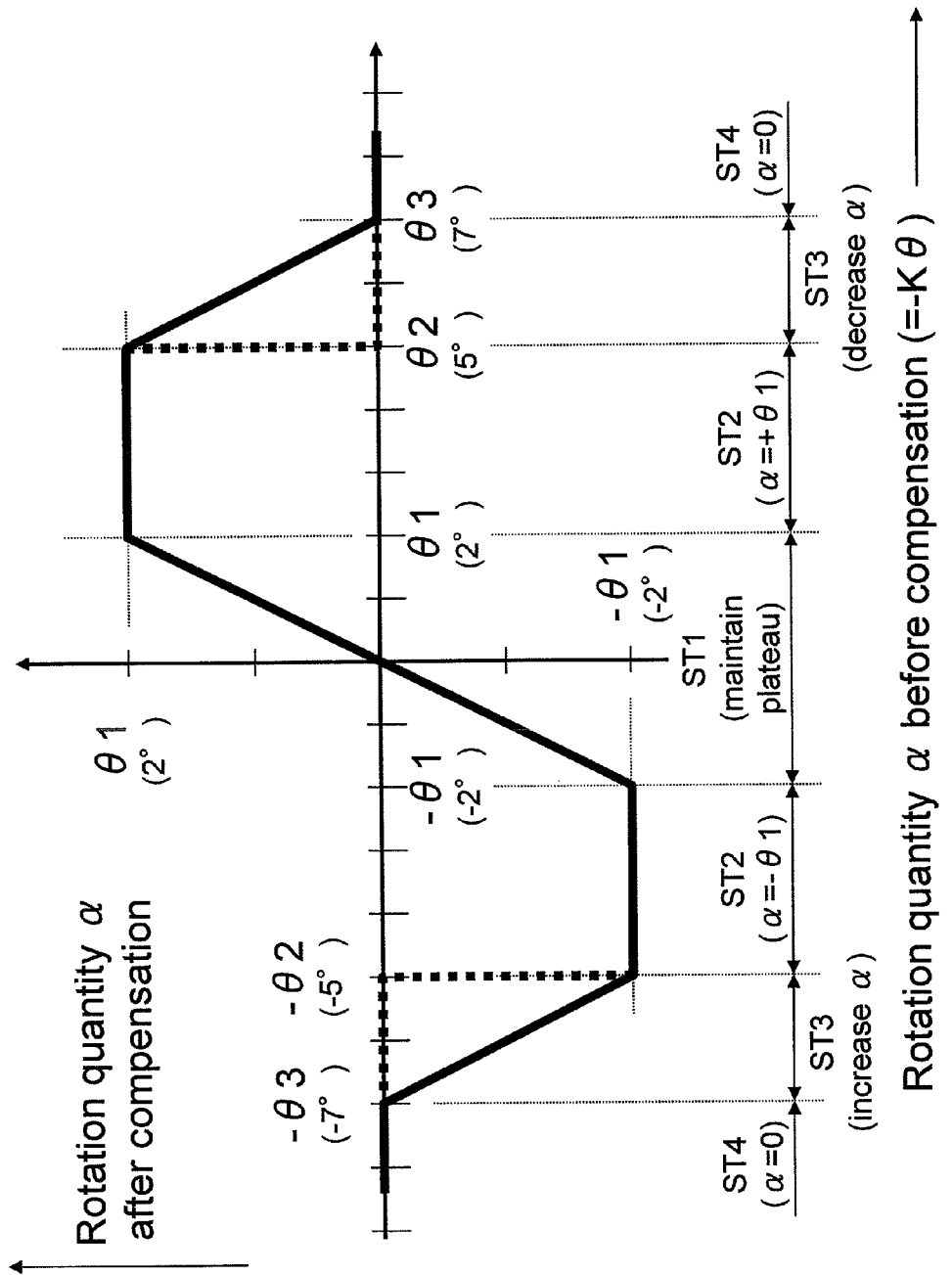
FIG. 14 represents a relationship between the rotation quantity a before compensation and the rotation quantity a after compensation.
Figure 15:
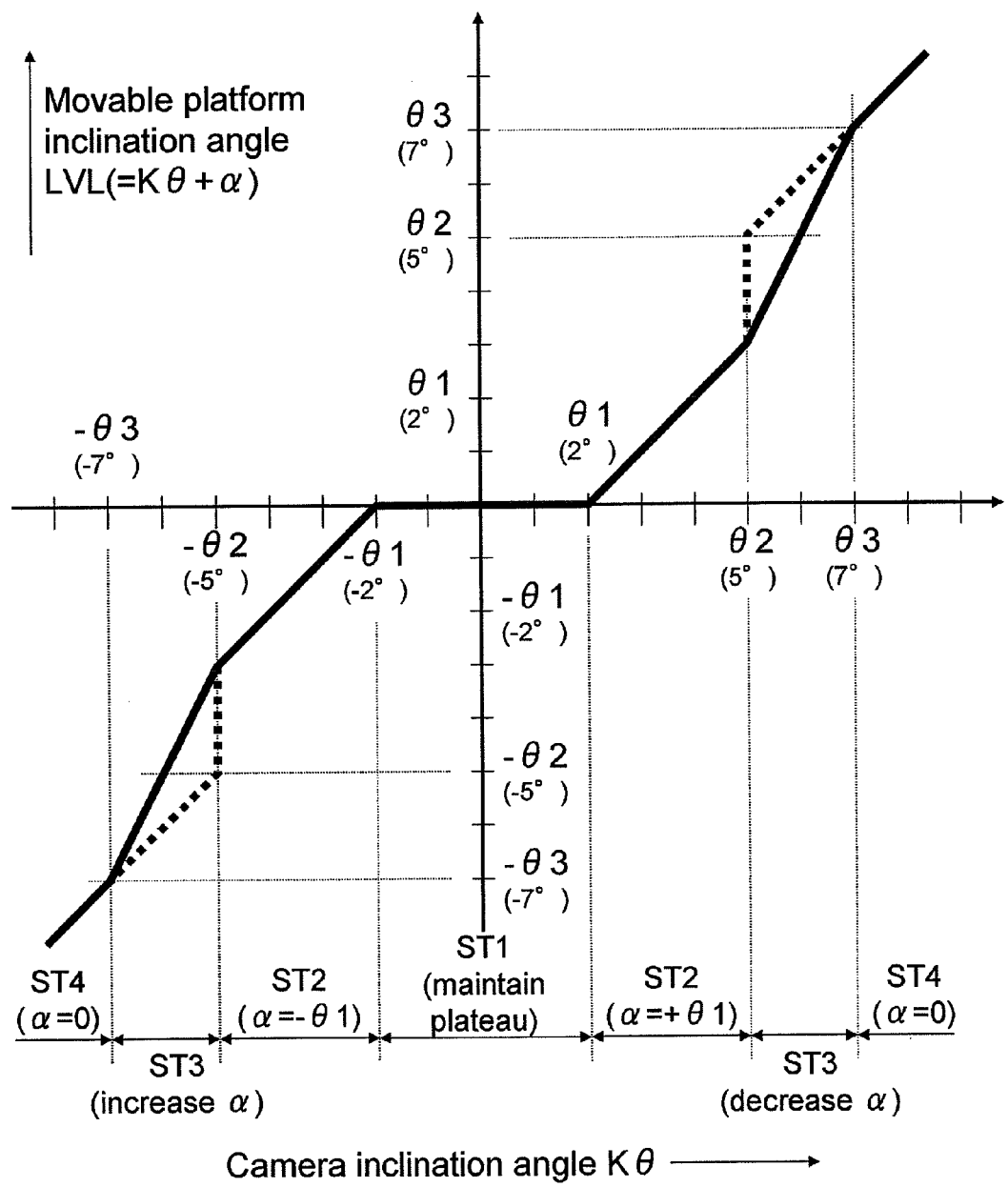
FIG. 15 represents a relationship between the camera inclination angle Kθ and the movable platform inclination angle LVL.

When the absolute value of the rotation quantity a is larger than the third angle θ3, in other words, the photographic apparatus 1 is in the fourth inclination state ST4, the rotation quantity α is compensated to 0 (see FIGS. 14 and 15.

The first angle θ1 is the maximum rotation angle at which the movable platform 30a can be rotated within its movement range in the initial state where the movable platform 30a is positioned at the center of its movement range in both the x and y directions, and each of the four sides of the rectangle composing the outline of the imaging surface of the imager (an imaging sensor) 39a1 is parallel to either the x direction or the y direction. The initial state is a position of the movable platform 30a before rotating for the inclination correction.

The first angle θ1 is a fixed value that is determined by design in advance (for example θ1=2 degrees).

The second angle θ2 is a rotation angle that is slightly larger than the first angle θ1. It is desirable to determine the suitable value for the second angle θ2 on the basis of experimentation (for example θ2=5 degrees).

The third angle θ3 is a rotation angle that is substantially larger than the first angle θ1. It is desirable to determine the suitable value for the third angle θ3 on the basis of experimentation (for example θ3=7 degrees).

In the first inclination state ST1, the rotation quantity α, which is set to the negative value of the camera inclination angle Kθ, is used for the inclination correction so as to offset the camera inclination angle Kθ by the rotation quantity α. Therefore, the inclination angle of the movable platform 30a formed by rotation of the movable platform 30a around its optical axis LL, as measured with respect to the level plane, which is the movable platform inclination angle LVL (=Kθ+α), becomes 0.

Thus, the movable platform 30a is leveled and this plateau (level status) of the movable platform 30a is maintained by the inclination correction.

When the absolute value of the camera inclination angle Kθ is larger than the first angle θ1, in other words, the photographic apparatus 1 is in either the second inclination state ST2, the third inclination state ST3, or the fourth inclination state ST4, the plateau (level status) of the movable platform 30a cannot be maintained because the movable platform inclination angle LVL does not become 0 even if the movable platform 30a is rotated by the maximum quantity within its movement range.

Therefore, in the embodiment, when the orientation of the photographic apparatus 1 is changed so that the absolute value of the camera inclination angle Kθ is larger than the first angle θ1, the CPU 21 controls the value of the rotation quantity α so as to restrain the sudden change caused by an effect of the inclination correction, in other words, so as to allow the absolute value of the rotation quantity a to gradually become 0.

Further, specifically in the second inclination state ST2, the rotation quantity α is compensated to the given angle (+θ1 or −θ1). In the third inclination state ST3, the rotation quantity α is compensated under the condition in which the absolute value of the rotation quantity a decreases in accordance to an increasing absolute value of the camera inclination angle Kθ. In the fourth inclination state ST4, the rotation quantity α is compensated to 0.

Because the rotation quantity α is maintained at the given angle (+θ1 or −θ1) in the second inclination state ST2, the gradient of the picture-composition while switching from the first inclination state ST1 to the second inclination state ST2 (or from the second inclination state ST2 to the first inclination state ST1) is small.

Furthermore, the absolute value of the rotation quantity α is compensated to gradually decrease in accordance to an increasing rotation quantity a before compensation, in the third inclination state ST3.

Therefore, the gradient of the picture-composition while switching from the third inclination state ST3 to the second inclination state ST2 (or from the second inclination state ST2 to the third inclination state ST3) is small, compared to when the absolute value of the rotation quantity α is compensated to rapidly decrease in accordance to an increasing rotation quantity α before compensation (see dotted lines of FIGS. 14 and 15).

If this gradient of the picture-composition is small, the gradient of the through image, captured by the imaging operation during this switching period will also be small.

Therefore, the possibility of this gradient of the through image bringing discomfort to the user is small (if the gradient of the through image is large, it may bring discomfort to the user).

Furthermore, because the gradient of the rotation quantity of the movable platform 30a decreases, the deterioration of the response to the controlled movement can be restrained.

Furthermore, the CPU 21 controls the display 17 to indicate the inclination information I10 on the through image. The inclination information I10 shows the inclination state of the photographic apparatus 1 (the first inclination state ST1, the second inclination state ST2, the third inclination state ST3, or the fourth inclination state ST4) (see FIGS. 7 and 8).

The inclination information I10 has a camera icon IC1 and a movable platform icon IC2. The camera icon IC1 represents an inclination state of the photographic apparatus 1, and corresponds to the camera inclination angle Kθ.

The movable platform icon IC2 represents an inclination state of the movable platform 30a, and corresponds to the movable platform inclination angle LVL.

When the photographic apparatus 1 is in the first inclination state ST1, the inclination information I10 is indicated under the condition in which the movable platform icon IC2 is leveled (see FIG. 7).

When the photographic apparatus 1 is in the second inclination state ST2, the inclination information I10 is indicated with a flashing icon (repeatedly cycles on and off) under the condition in which the movable platform icon IC2 is inclined in accordance to the first angle θ1 with respect to the level state.

Because the movable platform icon IC2 is small, the user may not be able to distinguish between the inclination information I10 in the first inclination state ST1 and the inclination information I10 in the second inclination state ST2 if flashing is not performed.

With the inclination information I10 flashing, the user can more easily distinguish between the flashing status and the non-flashing status in order to differentiate between the first inclination state ST1 and the second inclination state ST2.

When the photographic apparatus 1 is in the third inclination state ST3, the inclination information I10 is indicated with a flashing icon (repeatedly cycles on and off) under the condition in which the camera icon IC1 and the movable platform icon IC2 are both inclined.

When the photographic apparatus 1 is in the fourth inclination state ST4, the inclination information I10 is indicated under the condition in which the camera icon IC1 and the movable platform icon IC2 are both inclined (see FIG. 8).

Because the movable platform icon IC2 is small, the user may not be able to distinguish between the inclination information I10 in the third inclination state ST3 and the inclination information I10 in the fourth inclination state ST4 if flashing is not performed.

With the inclination information I10 flashing, the user can more easily distinguish between the flashing status and the non-flashing status in order to differentiate between the third inclination state ST3 and the fourth inclination state ST4.

Note that indication of the inclination information I10 is not limited to the above described method. For example, to indicate the inclination information I10 the values of the camera inclination angle K$\theta$ and the movable platform inclination angle LVL may be indicated on the through image or in the optical finder 18.

When the inclination state is changed, for example, when switching from the first inclination state ST1 to the second inclination state ST2, the computational equation for compensating the rotation quantity a changes so that the controlled movement will be different. But, because the gradient of the picture-composition is small, the user may not notice this change even if the user is observing the through image.

In the embodiment, the inclination information I10 is indicated on the through image. Therefore, while the user observes the inclination information I10, the user can confirm whether the photographic apparatus is in the first inclination state ST1, the second inclination state ST2, the third inclination state ST3, or the fourth inclination state ST4.

Note that instead of the indication of the inclination information I10, different warning sounds corresponding to the first inclination state ST1, the second inclination state ST2, the third inclination state ST3, and the fourth inclination state ST4 may be output in order to notify the user whether the photographic apparatus 1 is in the first inclination state ST1, the second inclination state St2, the third inclination state ST3, or the fourth inclination state ST4.

Figure 19:
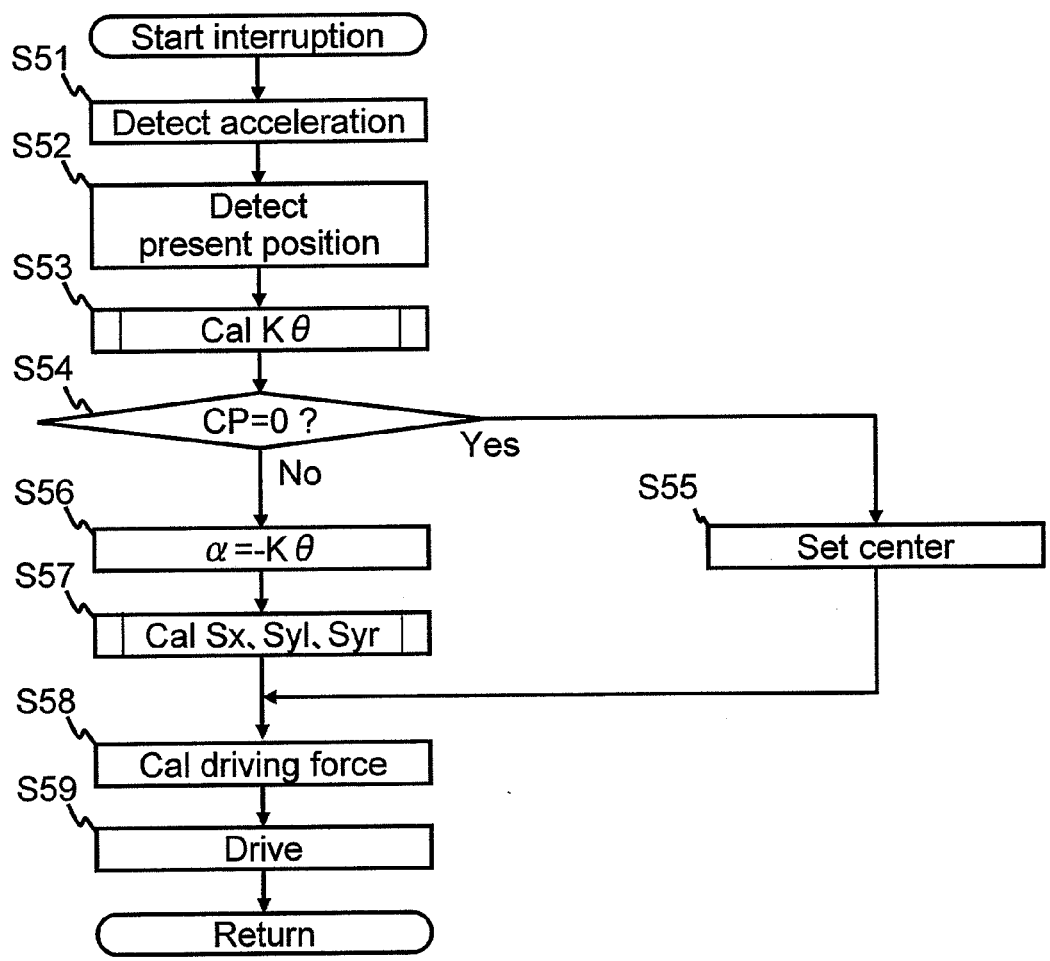
FIG. 19 is a flowchart that shows the details of the timer interrupt process.

The CPU 21 calculates the position S (Sx, Syl, Syr) where the imaging unit 39a (the movable platform 30a) should be moved in accordance to the rotation quantity $\alpha$ (see (2) in FIG. 9 and step S57 in FIG. 19), and moves the movable platform 30a to the calculated position S.

When the inclination correction is not performed (CP=0), the CPU 21 sets the position S (Sx, Syl, Syr), where the movable platform 30a should be moved, to the initial state (see (6) in FIG. 9 and step S55 in FIG. 19) and then moves the movable platform 30a to the position corresponding to the initial state.

A driving point on the movable platform 30a for moving the movable platform 30a in the x direction is defined as a horizontal driving point DPx.

Figure 16:
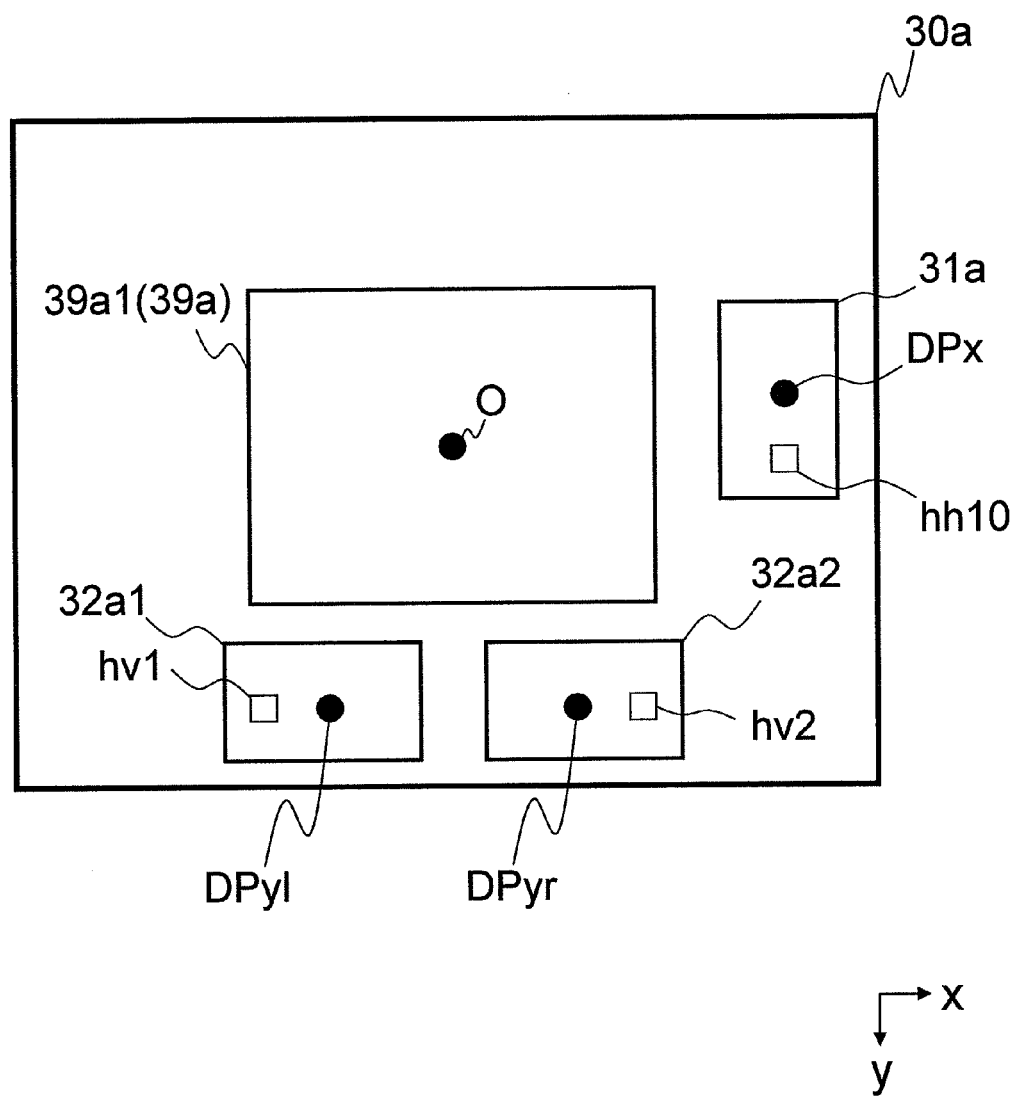
FIG. 16 is a construction diagram of the movable platform.
Figure 17:
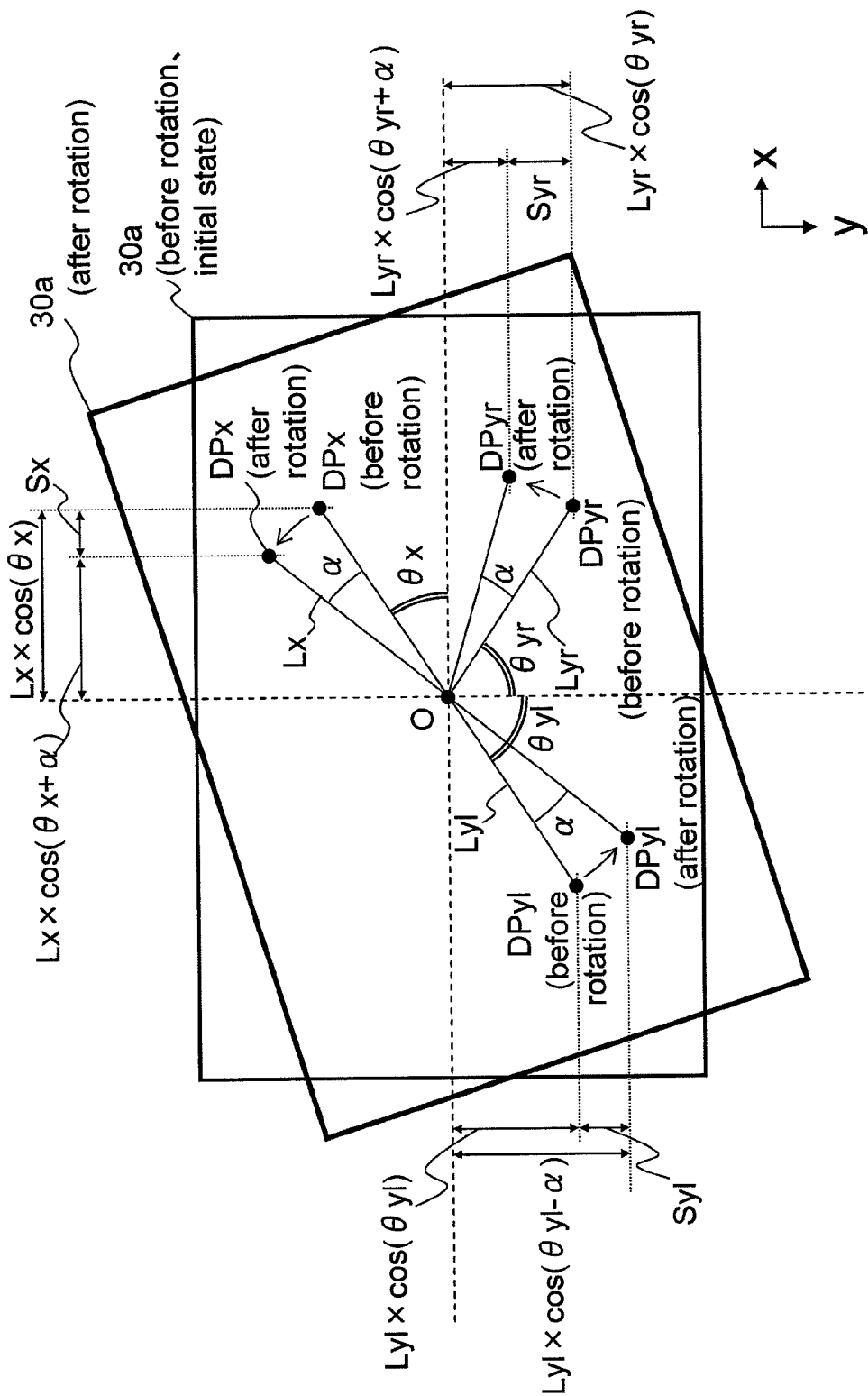
FIG. 17 illustrates the movement quantity of the horizontal driving point DPx in the x direction, the movement quantities of the first and second vertical driving points DPyl and DPyr in the y direction, in accordance to the rotation quantity α.

Driving points on the movable platform 30a for moving the movable platform 30a in the y direction and for rotating the movable platform 30a are defined as a first vertical driving point DPyl and a second vertical driving point DPyr (see FIGS. 16 and 17).

The horizontal driving point DPx is the point to which a horizontal electro-magnetic force based on a coil for driving the movable platform 30a in the x direction (the horizontal coil 31a) is applied. The horizontal driving point DPx is set to a position close to the horizontal hall sensor hh10.

The first vertical driving point DPyl is the point to which a first electro-magnetic force based on a coil for driving the movable platform 30a in the y direction (the first vertical coil 32a1) is applied. The first vertical driving point DPyl is set to a position close to the first vertical hall sensor hv1.

The second vertical driving point DPyr is the point to which a second electro-magnetic force based on a coil for driving the movable platform 30a in the y direction (the second vertical coil 32a2) is applied. The second vertical driving point DPyr is set to a position close to the second vertical hall sensor hv2.

The movement position Sx of the horizontal driving point DPx, which is the movement quantity to the position of the horizontal driving point DPx in the initial state, is calculated on the basis of the rotation quantity $\alpha$ (Sx=Lx×cos($\theta$x+$\alpha$)−Lx×cos($\theta$x)).

Note that the distance Lx is the distance between the rotation center O of the imaging surface of the imager 39a1 and the horizontal driving point DPx.

The angle $\theta$x is the angle between the x direction and the line passing through the rotation center O and the horizontal driving point DPx in the initial state.

The values Lx and $\theta$x are fixed values that are determined by design in advance (see FIG. 17).

The movement position Syl of the first vertical driving point DPyl, which is the movement quantity to the position of the first vertical driving point DPyl in the initial state, is calculated on the basis of the rotation quantity $\alpha$ (Syl=Lyl×cos($\theta$yl−$\alpha$)−Lyl×cos($\theta$yl)).

Note that the distance Lyl is the distance between the rotation center O of the imaging surface of the imager 39a1 and the first vertical driving point DPyl.

The angle $\theta$yl is the angle between the y direction and the line passing through the rotation center O and the first vertical driving point DPyl in the initial state.

The values Lyl and $\theta$yl are fixed values that are determined by design in advance.

The movement position Syr of the second vertical driving point DPyr, which is the movement quantity to the position of the second vertical driving point DPyr in the initial state, is calculated on the basis of the rotation quantity $\alpha$ (Syr=Lyr×cos($\theta$yr+$\alpha$)−Lyl×cos($\theta$yr)).

Note that the distance Lyr is the distance between the rotation center O of the imaging surface of the imager 39a1 and the second vertical driving point DPyr.

The angle $\theta$yr is the angle between the y direction and the line passing through the rotation center O and the second vertical driving point DPyr in the initial state.

The values Lyr and $\theta$yr are fixed values that are determined by design in advance.

The movement/rotation of the movable platform 30a, which includes the imaging unit 39a, is performed by using an electro-magnetic force and is described later.

The driving force D is for driving the driver circuit 29 in order to move the movable platform 30a to the position S.

The horizontal direction component of the driving force D for the horizontal coil 31a is defined as the horizontal driving force Dx (after D/A conversion, the horizontal PWM duty dx).

The vertical direction component of the driving force D for the first vertical coil 32a1 is defined as the first vertical driving force Dyl (after D/A conversion, the first vertical PWM duty dyl).

The vertical direction component of the driving force D for the second vertical coil 32a2 is defined as the second vertical driving force Dyr (after D/A conversion, the second vertical PWM duty dyr).

Driving of the movable platform 30a, including movement to the fixed (held) position of the initial state, is performed by the electro-magnetic force of the coil unit and the magnetic unit through the driver circuit 29, which has the horizontal PWM duty dx input from the PWM 0 of the CPU 21, the first vertical PWM duty dyl input from the PWM 1 of the CPU 21, and the second vertical PWM duty dyr input from the PWM 2 of the CPU 21 (see (3) in FIG. 9).

The detected position P of the movable platform 30a, either before or after the movement/rotation performed by the driver circuit 29, is detected by the hall sensor unit 44a and the hall sensor signal-processing unit 45.

Information regarding the horizontal direction component of the detected position P, in other words, the horizontal detected position signal px, is input to the A/D converter A/D 3 of the CPU 21 (see (4) in FIG. 9). The horizontal detected position signal px is an analog signal that is converted to a digital signal by the A/D converter A/D 3 (A/D conversion operation). The horizontal direction component of the detected position P after the A/D conversion operation is defined as pdx and corresponds to the horizontal detected position signal px.

Information regarding one of the vertical direction components of the detected position P, in other words, the first vertical detected position signal pyl, is input to the A/D converter A/D 4 of the CPU 21. The first vertical detected position signal pyl is an analog signal that is converted to a digital signal by the A/D converter A/D 4 (A/D conversion operation). The first vertical direction component of the detected position P after the A/D conversion operation is defined as pdyl and corresponds to the first vertical detected position signal pyl.

Information regarding the other of the vertical direction components of the detected position P, in other words, the second vertical detected position signal pyr, is input to the A/D converter A/D 5 of the CPU 21. The second vertical detected position signal pyr is an analog signal that is converted to a digital signal by the A/D converter A/D 5 (A/D conversion operation). The second vertical direction component of the detected position P after the A/D conversion operation is defined as pdyr and corresponds to the second vertical detected position signal pyr.

The PID (Proportional Integral Differential) control calculates the horizontal driving force Dx and the first and second vertical driving forces Dyl and Dyr on the basis of the coordinate data of the detected position P (pdx, pdyl, pdyr) and the position S (Sx, Syl, Syr) following movement (see (5) in FIG. 9).

Driving of the movable platform 30a to the position S corresponding to the inclination correction of the PID control is performed when the photographic apparatus 1 is in the inclination-correction mode (CP=1) where the inclination-correction ON/OFF correction switch 14a is set to the ON state.

When the inclination-correction parameter CP is 0, a PID control unrelated to the inclination correction is performed so that the movable platform 30a is set to the initial state such that the movable platform 30a is moved to the center of the movement range under the condition where each of the four sides composing the outline of the imaging surface of the imager 39a1 of the imaging unit 39a is parallel to either the x direction or the y direction (see (6) in FIG. 9).

When the absolute value of the camera inclination angle Kθ is larger than the third angle θ3 (|Kθ|>θ3), the rotation quantity α is compensated to 0 even if the photographic apparatus 1 is in the inclination-correction mode (CP=1).

In this case, the PID control unrelated to the inclination correction is performed so that the movable platform 30a is set to the initial state such that the movable platform 30a is moved to the center of the movement range under the condition where each of the four sides composing the outline of the imaging surface of the imager 39a1 of the imaging unit 39a is parallel to either the x direction or the y direction, similar to when the photographic apparatus 1 is in the non-inclination correction mode (CP=0).

The movable platform 30a has the coil unit for driving that is comprised of a horizontal coil 31a, a first vertical coil 32a1, a second vertical coil 32a2, an imaging unit 39a having the imager 39a1, and a hall sensor unit 44a as a magnetic-field change-detecting element unit (see FIGS. 6 and 16). In the embodiment, the imager 39a1 is a CCD; however, the imager 39a1 may be another type, such as a CMOS, etc.

The fixed unit 30b has a magnetic position detection and driving unit that is comprised of a horizontal magnet 411b, a first vertical magnet 412b1, a second vertical magnet 412b2, a horizontal yoke 431b, a first vertical yoke 432b1, and a second vertical yoke 432b2.

The fixed unit 30b movably and rotatably supports the movable platform 30a in the rectangular-shaped movement range on the xy plane, using balls, etc. The balls are arranged between the fixed unit 30b and the movable platform 30a.

When the center of the imager 39a1 (the rotation center O) is intersected by the optical axis LL of the camera lens 67, the relationship between the position of the movable platform 30a and the position of the fixed unit 30b is arranged so that the movable platform 30a is positioned at the center of its movement range in both the x direction and the y direction, in order to utilize the full size of the imaging range of the imager 39a1.

The rectangular shape of the imaging surface of the imager 39a1 has two diagonal lines. In the embodiment, the center of the imager 39a1 is at the intersection of these two diagonal lines.

When the PON switch 11a is set to the ON state corresponding to the depressed PON button 11, but before the inclination correction commences, the movable platform 30a is positioned at the center of its movement range in both the x and y directions, under the condition where each of the four sides of the rectangle composing the outline of the imaging surface of the imager (an imaging sensor) 39a1 is parallel to either the x direction or the y direction, as in the initial state. And then, the inclination correction commences (see step S15 in FIG. 18).

The horizontal coil 31a, the first vertical coil 32a1, the second vertical coil 32a2, and the hall sensor unit 44a are attached to the movable platform 30a.

The horizontal coil 31a forms a seat and a spiral-shaped coil pattern. The coil pattern of the horizontal coil 31a has lines that are parallel to the y direction, thus creating the horizontal electro-magnetic force to move the horizontal driving point DPx on the movable platform 30a that includes the horizontal coil 31a, in the x direction.

The horizontal electro-magnetic force is created by the current direction of the horizontal coil 31a and the magnetic-field direction of the horizontal magnet 411b.

The first vertical coil 32a1 forms a seat and a spiral-shaped coil pattern. The coil pattern of the first vertical coil 32a1 has lines that are parallel to the x direction, thus creating the first vertical electro-magnetic force to move the first vertical driving point DPyl on the movable platform 30a that includes the first vertical coil 32a1, in the y direction.

The first vertical electro-magnetic force is created by the current direction of the first vertical coil 32a1 and the magnetic-field direction of the first vertical magnet 412b1.

The second vertical coil 32a2 forms a seat and a spiral-shaped coil pattern. The coil pattern of the second vertical coil 32a2 has lines that are parallel to the x direction, thus creating the second vertical electro-magnetic force to move the second vertical driving point DPyr on the movable platform 30a that includes the second vertical coil 32a2, in the y direction and to rotate the movable platform 30a.

The second vertical electro-magnetic force is created by the current direction of the second vertical coil 32a2 and the magnetic-field direction of the second vertical magnet 412b2.

The horizontal coil 31a and the first and second vertical coils 32a1 and 32a2 are connected to the driver circuit 29, which drives the horizontal coil 31a and the first and second vertical coils 32a1 and 32a2, through the flexible circuit board (not depicted).

The horizontal PWM duty dx, which is a duty ratio of a PWM pulse, is input to the driver circuit 29 from the PWM 0 of the CPU 21. The first vertical PWM duty dyl, which is a duty ratio of a PWM pulse, is input to the driver circuit 29 from the PWM 1 of the CPU 21. The second vertical PWM duty dyr, which is a duty ratio of a PWM pulse, is input to the driver circuit 29 from the PWM 2 of the CPU 21.

The driver circuit 29 supplies power to the horizontal coil 31a, corresponding to the value of the horizontal PWM duty dx, in order to move the horizontal driving point DPx on the movable platform 30a in the x direction.

The driver circuit 29 supplies power to the first vertical coil 32a1, corresponding to the value of the first vertical PWM duty dyl, in order to move the first vertical driving point DPyl on the movable platform 30a in the y direction.

The driver circuit 29 supplies power to the second vertical coil 32a2, corresponding to the value of the second vertical PWM duty dyr, in order to move the second vertical driving point DPyr on the movable platform 30a in the y direction.

The first and second vertical coils 32a1 and 32a2 are arranged in the x direction in the initial state.

The first and second vertical coils 32a1 and 32a2 are arranged in the initial state such that the distance between the center of the imager 39a1 (the rotation center O) and the central area of the first vertical coil 32a1 in the y direction is the same as the distance between the center of the imager 39a1 (the rotation center O) and the central area of the second vertical coil 32a2 in the y direction.

The horizontal magnet 411b is attached to the movable platform side of the fixed unit 30b, where the horizontal magnet 411b faces the horizontal coil 31a and the horizontal hall sensor hh10 in the z direction.

The first vertical magnet 412b1 is attached to the movable platform side of the fixed unit 30b, where the first vertical magnet 412b1 faces the first vertical coil 32a1 and the first vertical hall sensor hv1 in the z direction.

The second vertical magnet 412b2 is attached to the movable platform side of the fixed unit 30b, where the second vertical magnet 412b2 faces the second vertical coil 32a2 and the second vertical hall sensor hv2 in the z direction.

The horizontal magnet 411b is attached to the horizontal yoke 431b, such that the N pole and S pole are arranged in the x direction. The horizontal yoke 431b is attached to the fixed unit 30b.

The first vertical magnet 412b1 is attached to the first vertical yoke 432b1, such that the N pole and S pole are arranged in the y direction. The first vertical yoke 432b1 is attached to the fixed unit 30b.

Likewise, the second vertical magnet 412b2 is attached to the second vertical yoke 432b2, such that the N pole and S pole are arranged in the y direction. The second vertical yoke 432b2 is attached to the fixed unit 30b.

The horizontal yoke 431b is made of a soft magnetic material.

The horizontal yoke 431b prevents the magnetic field of the horizontal magnet 411b from dissipating to the surroundings, and raises the magnetic-flux density between the horizontal magnet 411b and the horizontal coil 31a, and between the horizontal magnet 411b and the horizontal hall sensor hh10.

The first and second vertical yokes 432b1 and 432b2 are made of a soft magnetic material.

The first vertical yoke 432b1 prevents the magnetic field of the first vertical magnet 412b1 from dissipating to the surroundings, and raises the magnetic-flux density between the first vertical magnet 412b1 and the first vertical coil 32a1, and between the first vertical magnet 412b1 and the first vertical hall sensor hv1.

Likewise, the second vertical yoke 432b2 prevents the magnetic field of the second vertical magnet 412b2 from dissipating to the surroundings, and raises the magnetic-flux density between the second vertical magnet 412b2 and the second vertical coil 32a2, and between the second vertical magnet 412b2 and the second vertical hall sensor hv2.

The horizontal yoke 431b and the first and second vertical yokes 432b1 and 432b2 may be composed of one body or separate bodies.

The hall sensor unit 44a is a single-axis hall sensor with three component hall sensors that are electromagnetic converting elements (magnetic-field change-detecting elements) using the Hall Effect. The hall sensor unit 44a detects the horizontal detected position signal px as the present position P of the movable platform 30a in the x direction, the first vertical detected position signal pyl and the second vertical detected position signal pyr as the present position P of the movable platform 30a in the y direction.

One of the three hall sensors is a horizontal hall sensor hh10 for detecting the horizontal detected position signal px, and another of the three hall sensors is a first vertical hall sensor hv1 for detecting the first vertical detected position signal pyl, with the third being a second vertical hall sensor hv2 for detecting the second vertical detected position signal pyr.

The horizontal hall sensor hh10 is attached to the movable platform 30a, where the horizontal hall sensor hh10 faces the horizontal magnet 411b of the fixed unit 30b in the z direction, and where the horizontal driving point DPx is set to a position close to the horizontal hall sensor hh10.

The horizontal hall sensor hh10 may be arranged outside the spiral winding of the horizontal coil 31a in the y direction. However, it is desirable for the horizontal hall sensor hh10 to be arranged inside the spiral winding of the horizontal coil 31a, and midway along the outer circumference of the spiral winding of the horizontal coil 31a in the x direction (see FIG. 16).

The horizontal hall sensor hh10 is layered on the horizontal coil 31a in the z direction. Accordingly, the area in which the magnetic field is generated for the position-detecting operation and the area in which the magnetic field is generated for driving the movable platform 30a are shared. Therefore, the length of the horizontal magnet 411b in the y direction and the length of the horizontal yoke 431b in the y direction can be shortened.

Furthermore, the horizontal driving point DPx, to which the horizontal electro-magnetic force based on the horizontal coil 31a is applied, can be close to a position-detecting point by the horizontal hall sensor hh10. Therefore, accurate driving control of the movable platform 30a in the x direction can be performed.

The first vertical hall sensor hv1 is attached to the movable platform 30a, where the first vertical hall sensor hv1 faces the first vertical magnet 412b1 of the fixed unit 30b in the z direction, and where the first vertical driving point DPyl is set to a position close to the first vertical hall sensor hv1.

The second vertical hall sensor hv2 is attached to the movable platform 30a, where the second vertical hall sensor hv2 faces the second vertical magnet 412b2 of the fixed unit 30b in the z direction, and where the second vertical driving point DPyr is set to a position close to the second vertical hall sensor hv2.

The first and second vertical hall sensors hv1 and hv2 are arranged in the x direction in the initial state.

The first vertical hall sensor hv1 may be arranged outside the spiral winding of the first vertical coil 32a1 in the x direction. However, it is desirable for the first vertical hall sensor hv1 to be arranged inside the spiral winding of the first vertical coil 32a1, and midway along the outer circumference of the spiral winding of the first vertical coil 32a1 in the y direction.

The first vertical hall sensor hv1 is layered on the first vertical coil 32a1 in the z direction. Accordingly, the area in which the magnetic field is generated for the position-detecting operation and the area in which the magnetic field is generated for driving the movable platform 30a are shared. Therefore, the length of the first vertical magnet 412b1 in the x direction and the length of the first vertical yoke 432b1 in the x direction can be shortened.

The second vertical hall sensor hv2 may be arranged outside the spiral winding of the second vertical coil 32a2 in the x direction. However, it is desirable for the second vertical hall sensor hv2 to be arranged inside the spiral winding of the second vertical coil 32a2, and midway along the outer circumference of the spiral winding of the second vertical coil 32a2 in the y direction.

The second vertical hall sensor hv2 is layered on the second vertical coil 32a2 in the z direction. Accordingly, the area in which the magnetic field is generated for the position-detecting operation and the area in which the magnetic field is generated for driving the movable platform 30a are shared. Therefore, the length of the second vertical magnet 412b2 in the x direction and the length of the second vertical yoke 432b2 in the x direction can be shortened.

Furthermore, the first vertical driving point DPyl, to which the first vertical electro-magnetic force based on the first vertical coil 32a1 is applied, can be close to a position-detecting point by the first vertical hall sensor hv1, and the second vertical driving point DPyr, to which the second vertical electro-magnetic force based on the second vertical coil 32a2 is applied, can be close to a position-detecting point by the second vertical hall sensor hv2. Therefore, accurate driving control of the movable platform 30a in the y direction can be performed.

In the initial state and when the center of the imager 39a1 (the rotation center O) is intersected by the optical axis LL of the camera lens 67, it is desirable for the horizontal hall sensor hh10 to be located on the hall sensor unit 44a so that it faces an intermediate area between the N pole and S pole of the horizontal magnet 411b in the x direction, as viewed from the z direction, to perform the position-detecting operation and utilize the full range within which an accurate position-detecting operation can be performed based on the linear output change (linearity) of the single-axis hall sensor.

Similarly, in the initial state and when the center of the imager 39a1 (the rotation center O) is intersected by the optical axis LL of the camera lens 67, it is desirable for the first vertical hall sensor hv1 to be located on the hall sensor unit 44a so that it faces an intermediate area between the N pole and S pole of the first vertical magnet 412b1 in the y direction, as viewed from the z direction.

Likewise, in the initial state and when the center of the imager 39a1 (the rotation center O) is intersected by the optical axis LL of the camera lens 67, it is desirable for the second vertical hall sensor hv2 to be located on the hall sensor unit 44a so that it faces an intermediate area between the N pole and S pole of the second vertical magnet 412b2 in the y direction, as viewed from the z direction.

The first hall sensor signal-processing unit 45 has a signal processing circuit of the magnetic-field change-detecting element that is comprised of a first hall sensor signal-processing circuit 450, a second hall sensor signal-processing circuit 460, and a third hall sensor signal-processing circuit 470.

The first hall sensor signal-processing circuit 450 detects a horizontal potential difference between the output terminals of the horizontal hall sensor hh10, based on the output signal of the horizontal hall sensor hh10.

The first hall sensor signal-processing circuit 450 outputs the horizontal detected position signal px to the A/D converter A/D 3 of the CPU 21, on the basis of the horizontal potential difference. The horizontal detected position signal px represents the specific location of the horizontal hall sensor hh10 on the movable platform 30a, in the x direction.

The first hall sensor signal-processing circuit 450 is connected to the horizontal hall sensor hh10 through the flexible circuit board (not depicted).

The second hall sensor signal-processing circuit 460 detects a first vertical potential difference between the output terminals of the first vertical hall sensor hv1, based on the output signal of the first vertical hall sensor hv1.

The second hall sensor signal-processing circuit 460 outputs the first vertical detected position signal pyl to the A/D converter A/D 4 of the CPU 21, on the basis of the first vertical potential difference. The first vertical detected position signal pyl represents the specific location of the first vertical hall sensor hv1 (the position-detecting point by the first vertical hall sensor hv1) on the movable platform 30a, in the y direction.

The second hall sensor signal-processing circuit 460 is connected to the first vertical hall sensor hv1 through the flexible circuit board (not depicted).

The third hall sensor signal-processing circuit 470 detects a second vertical potential difference between the output terminals of the second vertical hall sensor hv2, based on the output signal of the second vertical hall sensor hv2.

The third hall sensor signal-processing circuit 470 outputs the second vertical detected position signal pyr to the A/D converter A/D 5 of the CPU 21, on the basis of the second vertical potential difference. The second vertical detected position signal pyr represents the specific location of the second vertical hall sensor hv2 (the position-detecting point by the second vertical hall sensor hv2) on the movable platform 30a, in the y direction.

The third hall sensor signal-processing circuit 470 is connected to the second vertical hall sensor hv2 through the flexible circuit board (not depicted).

In the embodiment, the three hall sensors (hh10, hv1 and hv2) are configured to specify the location of the movable platform 30a including the rotational (inclination) angle.

The locations in the y direction of the two points on the movable platform 30a are determined by using two of the three hall sensors (hv1 and hv2). These two points are close to the first vertical driving point DPyl and the second vertical driving point DPyr, respectively. The location in the x direction of the one point on the movable platform 30a is determined by using another of the three hall sensors (hh10). This one point is close to the horizontal driving point DPx. The location of the movable platform 30a, which includes the rotational (inclination) angle on the xy plane, can be determined on the basis of the information regarding the locations in the x direction of the one point and the location in the y direction of the two points.

Figure 18:
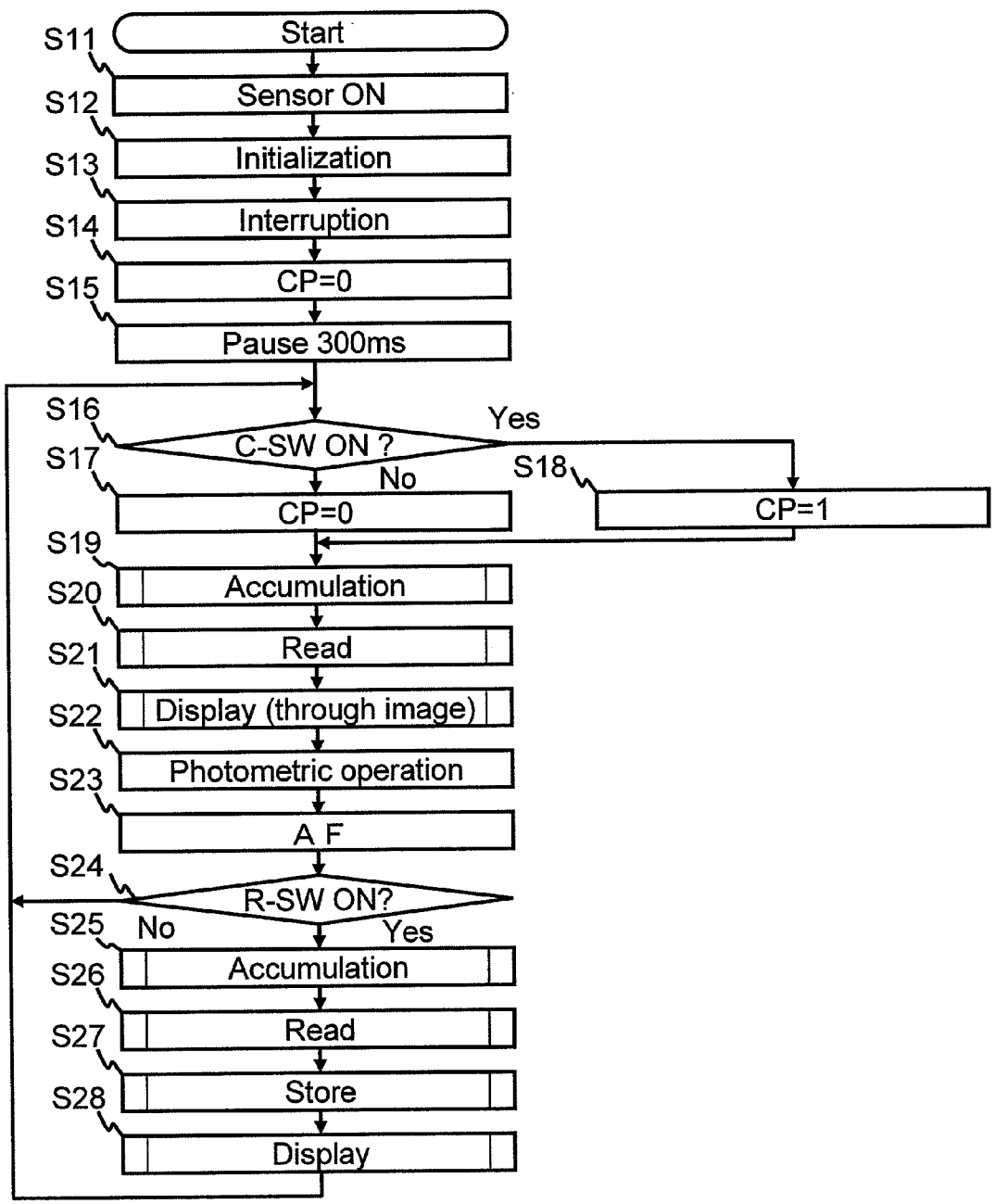
FIG. 18 is a flowchart that shows the main operation of the photographic apparatus.

Next, the main operation of the photographic apparatus 1 in the embodiment is explained using the flowchart of FIG. 18.

When the PON switch 11a is set to the ON state, the photographic apparatus 1 is set to the ON state and electrical power is supplied to the inclination detection unit 25 so that the inclination detection unit 25 is set to the ON state in step S11.

In step S12 the CPU 21 initializes the values, which include the rotation quantity α.

Specifically, the CPU 21 sets the value of the rotation quantity α to 0.

In step S13, a timer interrupt process at the predetermined time interval (1 ms) commences. The details of the timer interrupt process in the embodiment are explained later using the flowcharts of FIGS. 19-22.

In step S14, the CPU 21 sets the value of the inclination-correction parameter CP to 0.

In step S15, the CPU 21 pauses for 300 ms. After 300 ms has elapsed, the operation continues to step S16.

In the interrupt process that is performed during this waiting period of 300 ms, the movable platform 30a is positioned in its initial state at the center of its movement range in both the x and y directions, under the condition where each of the four sides of the rectangle composing the outline of the imaging surface of the imager (an imaging sensor) 39a1 is parallel to either the x direction or the y direction. Furthermore, the lens information is communicated from the camera lens 67 to the CPU 21.

In step S16, the CPU 21 determines whether the inclination-correction ON/OFF switch 14a (C-SW in FIG. 18) is set to the ON state. When the CPU 21 determines that the inclination-correction ON/OFF switch 14a is not set to the ON state, the operation continues to step S17. Otherwise, the operation proceeds to step S18.

In step S17, the CPU 21 sets the value of the inclination-correction parameter CP to 0.

In step S18, the CPU 21 sets the value of the inclination-correction parameter CP to 1.

In step S19, the exposure operation, that is, the electric charge accumulation of the imager 39a1 (CCD etc.), is performed.

In step S20, the electric charge accumulated in the imager 39a1 during the exposure time is read. In step S21, the CPU 21 communicates with the DSP 19 so that the image-processing operation is performed based on the electric charge read from the imager 39a1. The image on which the image-processing operation is performed is displayed on the display 17 (the indication of the through image).

In step S22, the photometric operation is performed by the AE unit 23 so that the aperture value and the duration of the exposure operation are calculated.

In step S23, the AF sensing operation is performed by the AF unit 24 and the focusing operation is performed by driving the lens control circuit.

In step S24, the CPU 21 determines whether the shutter release switch 13a (R-SW in FIG. 18) is set to the ON state. When the CPU 21 determines that the shutter release switch 13a is not set to the ON state, the operation returns to step S16 and the process described in steps S16-S23 is repeated. Otherwise, the operation continues on to step S25.

In step S25, the exposure operation, that is, the electric charge accumulation of the imager 39a1 (CCD etc.), is performed. In step S26, the electric charge accumulated in the imager 39a1 during the exposure time is read. In step S27, the CPU 21 communicates with the DSP 19 so that the image-processing operation is performed based on the electric charge read from the imager 39a1. The image on which the image-processing operation is performed is stored in the memory of the photographic apparatus 1. In step S28, the image stored in the memory is displayed on the display 17, and the operation then returns to step S16. In other words, the photographic apparatus 1 is returned to a state in which the next imaging operation can be performed.

Next, the timer interrupt process in the embodiment, which commences in step S13 of FIG. 18 and is performed at every predetermined time interval (1 ms) independent of the other operations, is explained using the flowchart of FIG. 19.

When the timer interrupt process commences, the first acceleration ah, which is output from the inclination detection unit 25, is input to the A/D converter A/D 1 of the CPU 21 and converted to the first digital acceleration signal Dah in step S51. Similarly, the second acceleration av, which is also output from the inclination detection unit 25, is input to the A/D converter A/D 2 of the CPU 21 and converted to the second digital acceleration signal Dav (the acceleration detection operation).

In the acceleration detection operation in step S51, the first acceleration ah and the second acceleration av, which are amplified by the first and second amplifiers 28a and 28b, are input to the CPU 21.

The high frequencies of the first and second digital acceleration signals Dah and Day are reduced in the digital low-pass filtering process (the first and second digital acceleration Aah and Aav).

In step S52, the hall sensor unit 44a detects the position of the movable platform 30a. The horizontal detected position signal px and the first and second vertical detected position signals pyl and pyr are calculated by the hall sensor signal-processing unit 45. The horizontal detected position signal px is then input to the A/D converter A/D 3 of the CPU 21 and converted to the digital signal pdx, the first vertical detected position signal pyl is then input to the A/D converter A/D 4 of the CPU 21 and converted to the digital signal pdyl, and the second vertical detected position signal pyr is input to the A/D converter A/D 5 of the CPU 21 and also converted to the digital signal pdyr, both of which thus specify the present position P (pdx, pdyl, pdyr) of the movable platform 30a (see (4) in FIG. 9).

In step S53, the CPU 21 calculates the camera inclination angle Kθ on the basis of the first and second digital accelerations Aah and Aav (see (1) in FIG. 9).

The details of the calculation of the camera inclination angle Kθ in the embodiment are explained later using the flowchart of FIG. 20.

In step S54, the CPU 21 determines whether the value of the inclination-correction parameter CP is 0. When the CPU 21 determines that the value of the inclination-correction parameter CP is 0 (CP=0), in other words, that the photographic apparatus 1 is not in the inclination-correction mode, the operation continues to step S55.

When the CPU 21 determines that the value of the inclination-correction parameter CP is not 0 (CP=1), in other words when the photographic apparatus 1 is in inclination-correction mode, the operation proceeds to step S56.

In step S55, the CPU 21 sets the position S (Sx, Syl, Syr), which is where the movable platform 30a should be moved, to the center of its movement range in both the x and y directions, under the condition in which each of the four sides of the rectangle composing the outline of the imaging surface of the imager (an imaging sensor) 39a1 is parallel to either the x direction or the y direction. (see (6) in FIG. 9). In other words, the movable platform 30*a* is set to the initial state.

In step S56, the CPU 21 calculates the magnitude of the rotation quantity a on the basis of the camera inclination angle Kθ (α=−Kθ).

In step S57, the CPU 21 calculates the position S (Sx, Syl, Syr) where the movable platform 30*a* should be moved (the movement position Sx of the horizontal driving point DPx, the movement position Syl of the first vertical driving point DPyl, and the movement position Syr of the second vertical driving point DPyr), on the basis of the rotation quantity α, etc. (see (2) in FIG. 9).

The details of the calculation of the position S (Sx, Syl, Syr) in the embodiment are explained later using the flowchart of FIGS. 21 and 22.

In step S58, the CPU 21 calculates the horizontal driving force Dx (the horizontal PWM duty dx), the first vertical driving force Dyl (the first vertical PWM duty dyl), and the second vertical driving force Dyr (the second vertical PWM duty dyr) of the driving force D, which moves the movable platform 30*a* to the position S on the basis of the present position P (pdx, pdyl, pdyr) and the coordinates of position S (Sx, Syl, Syr) that were determined in step S55 or step S57 (see (5) in FIG. 9).

In step S59, the horizontal coil 31*a* is driven by applying the horizontal PWM duty dx through the driver circuit 29: the first vertical coil 32*a*1 is driven by applying the first vertical PWM duty dyl through the driver circuit 29 and the second vertical coil 32*a*2 is driven by applying the second vertical PWM duty dyr through the driver circuit 29, so that the movable platform 30*a* is moved to position S (Sx, Syl, Syr) (see (3) in FIG. 9).

The process of steps S58 and S59 is an automatic control calculation that is performed by the PID automatic control for performing general (normal) proportional, integral, and differential calculations.

Next, the calculation of the camera inclination angle Kθ, which is performed in step S53 of FIG. 19, is explained using the flowchart of FIG. 20.

When the calculation of the camera inclination angle Kθ commences, the CPU 21 determines whether the absolute value of the second digital acceleration Aav is larger than or equal to the absolute value of the first digital acceleration Aah, in step S71.

When the CPU 21 determines that the absolute value of the second digital acceleration Aav is larger than or equal to the absolute value of the first digital acceleration Aah, the operation proceeds to step S75, otherwise, the operation continues to step S72.

In step S72, the CPU 21 determines whether the first digital acceleration Aah is larger than or equal to 0. When the CPU 21 determines that the first digital acceleration Aah is larger than or equal to 0, the operation proceeds to step S74, otherwise, the operation continues to step S73.

In step S73, the CPU 21 determines that the photographic apparatus 1 is held approximately in the first vertical orientation, and calculates the camera inclination angle Kθ by taking the negative value of the arcsine transformation of the second digital acceleration Aav (Kθ=−Sin$^{-1}$ (Aav)).

In step S74, the CPU 21 determines that the photographic apparatus is held approximately in the second vertical orientation, and calculates the camera inclination angle Kθ by performing the arcsine transformation on the second digital acceleration Aav (Kθ=+Sin$^{-1}$ (Aav)).

In step S75, the CPU 21 determines whether the second digital acceleration Aav is larger than or equal to 0. When the CPU 21 determines that the second digital acceleration Aav is larger than or equal to 0, the operation proceeds to step S77, otherwise, the operation continues to step S76.

In step S76, the CPU 21 determines that the photographic apparatus 1 is held approximately in the second horizontal orientation, and calculates the camera inclination angle Kθ by performing the arcsine transformation on the first digital acceleration Aah (Kθ=+Sin$^{-1}$ (Aah)).

In step S77, the CPU 21 determines that the photographic apparatus is held approximately in the first horizontal orientation, and calculates the camera inclination angle Kθ by taking the negative value of the arcsine transformation of the first digital acceleration Aah (Kθ=−Sin$^{-1}$ (Aah)).

Figure 21:
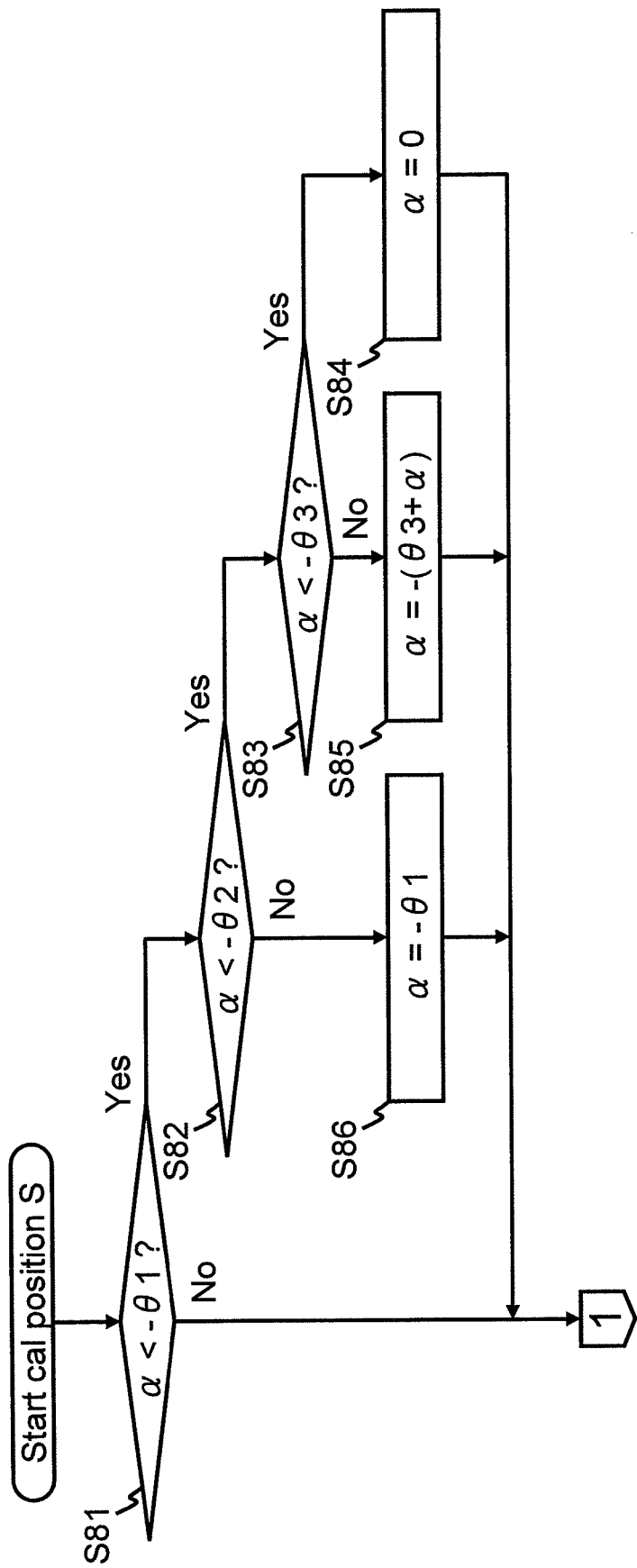
FIGS. 21 and 22 are a flowchart that shows the details of the calculation of the position S.
Figure 22:
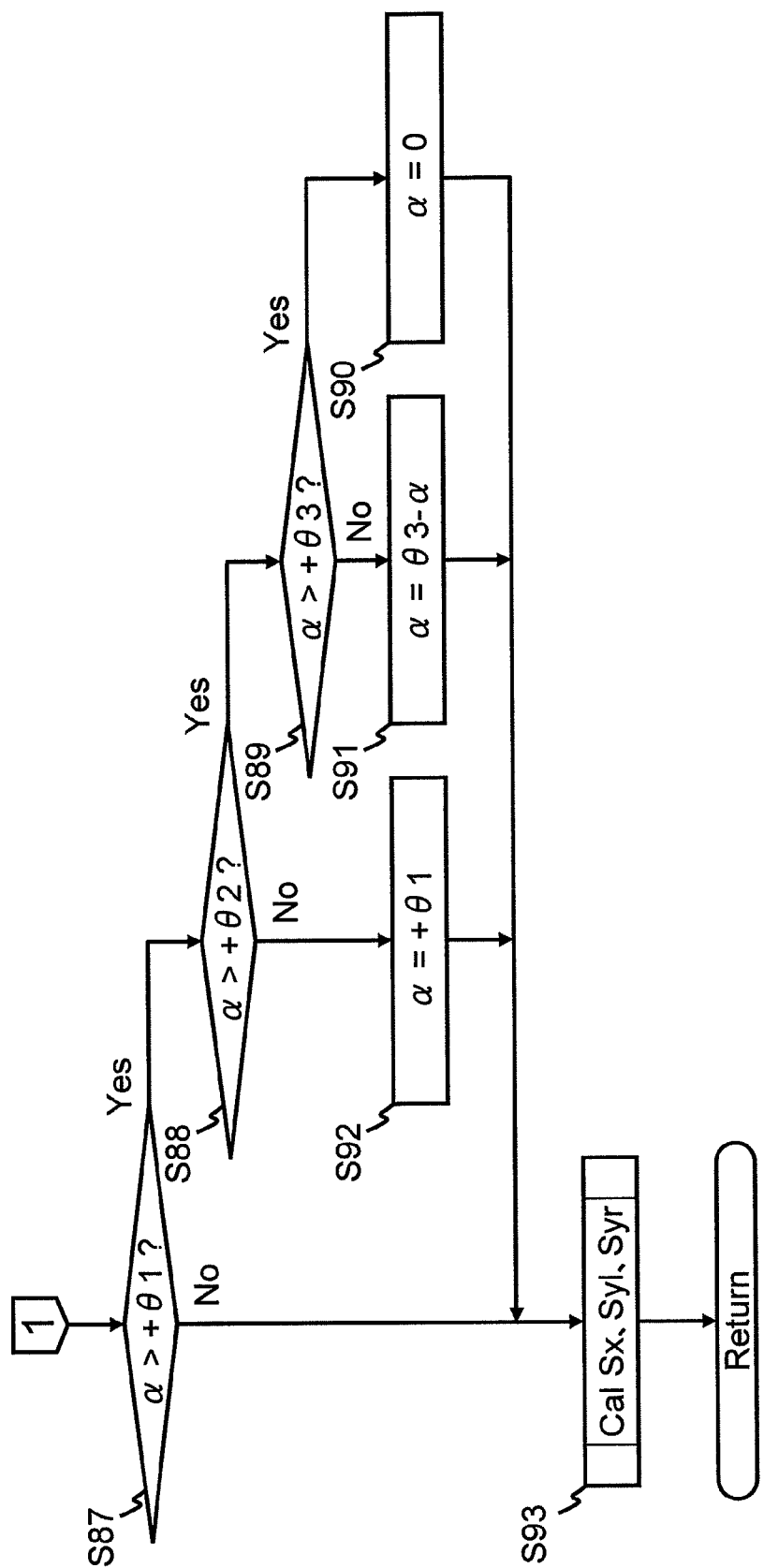

Next, the calculation of the position S (Sx, Syl, Syr) where the movable platform 30*a* should be moved, which is performed in step S57 of FIG. 19, is explained using the flowchart of FIGS. 21 and 22.

When the calculation of the position S commences, the CPU 21 determines whether the rotation angle α is less than the negative value of the first angle θ1, in step S81. When the CPU 21 determines that the rotation angle α is less than the negative value of the first angle θ1, the operation continues to step S82. Otherwise, the operation proceeds to step S87.

In step S82, the CPU 21 determines whether the rotation angle α is less than the negative value of the second angle θ2. When the CPU 21 determines that the rotation angle α is less than the negative value of the second angle θ2, the operation continues to step S83. Otherwise, the operation proceeds to step S86.

In step S83, the CPU 21 determines whether the rotation angle α is less than the negative value of the third angle θ3. When the CPU 21 determines that the rotation angle α is less than the negative value of the third angle θ3, the operation continues to step S84. Otherwise, the operation proceeds to step S85.

In step S84, the CPU 21 compensates the value of the rotation quantity α to 0.

In step S85, the CPU 21 compensates the value of the rotation quantity α to the negative value of the sum of the third angle θ3 and the present rotation quantity α.

In step S86, the CPU 21 compensates the value of the rotation quantity α to the negative value of the first angle θ1.

In step S87, the CPU 21 determines whether the rotation angle α is larger than the first angle θ1. When the CPU 21 determines that the rotation angle α is larger than the first angle θ1, the operation continues to step S88. Otherwise, the operation proceeds to step S93.

In step S88, the CPU 21 determines whether the rotation angle α is larger than the second angle θ2. When the CPU 21 determines that the rotation angle α is larger than the second angle θ2, the operation continues to step S89. Otherwise, the operation proceeds to step S92.

In step S89, the CPU 21 determines whether the rotation angle α is larger than the third angle θ3. When the CPU 21 determines that the rotation angle α is larger than the third angle θ3, the operation continues to step S90. Otherwise, the operation proceeds to step S91.

In step S90, the CPU 21 compensates the value of the rotation quantity a to 0.

In step S91, the CPU 21 compensates the value of the rotation quantity α to the difference between the third angle θ3 and the present rotation quantity α.

In step S92, the CPU 21 compensates the value of the rotation quantity a to the first angle θ1.

In step S93, the CPU 21 calculates the position S (Sx, Syl, Syr) where the movable platform 30*a* should be moved (the movement position Sx of the horizontal driving point DPx, the movement position Syl of the first vertical driving point DPyl, and the movement position Syr of the second vertical driving point DPyr), on the basis of the rotation quantity α, etc.

Note that, it is explained that the hall sensor is configured to perform position detection as the magnetic-field change-detecting element. However, another detection element, an MI (Magnetic Impedance) sensor such as a high-frequency carrier-type magnetic-field sensor, a magnetic resonance-type magnetic-field detecting element, or an MR (Magneto-Resistance effect) element may be configured to perform position detection purposes. When one of either the MI sensor, the magnetic resonance-type magnetic-field detecting element, or the MR element is used, the information regarding the position of the movable platform can be obtained by detecting the magnetic-field change, similar to using the hall sensor.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2008-330415 (filed on Dec. 25, 2008), which is expressly incorporated herein by reference, in its entirety.

The invention claimed is:

1. A photographic apparatus comprising:
   a movable platform that has an imager that captures an optical image through a taking lens, and is movable and rotatable on an xy plane perpendicular to an optical axis of said taking lens; and
   a controller that calculates an inclination angle of said photographic apparatus, which is formed by rotation of said photographic apparatus around said optical axis, as measured with respect to a level plane perpendicular to the direction of gravitational force, and performs a controlled movement of said movable platform for an inclination correction by rotating said movable platform from an initial state on said xy plane in accordance to a rotation quantity of said movable platform, said initial state being a position of said movable platform before rotating for said inclination correction, said rotation quantity being set on the basis of said inclination angle;
   said controller performing said controlled movement so as to offset said inclination angle by said rotation quantity, when said photographic apparatus is in a first inclination state where the absolute value of said inclination angle is less than or equal to a first angle, said first angle being the maximum rotation angle at which said movable platform can be rotated within its movement range in said initial state;
   said controller performing said controlled movement so as to maintain an inclined state where said movable platform is rotated from said initial state in accordance to either said first angle or the negative of said first angle, when said photographic apparatus is in a second inclination state where said inclination angle is larger than said first angle but less than or equal to a second angle that is larger than said first angle;
   said controller performing said controlled movement so as to compensate said rotation quantity under the condition in which the absolute value of said rotation quantity decreases in accordance to an increasing absolute value of said inclination angle, when said photographic apparatus is in a third inclination state where said inclination angle is larger than said second angle but less than or equal to a third angle that is larger than said second angle; and
   said controller performing said controlled movement so as to maintain said initial state, when said photographic apparatus is in a fourth inclination state where said inclination angle is larger than said third angle.

2. The photographic apparatus according to claim 1, wherein said controller generates an output showing a difference between said first, second, third, and fourth inclination states.

3. The photographic apparatus according to claim 1, wherein said controller performs said controlled movement so as to maintain said initial state when said inclination correction is not performed.

* * * * *